US011999579B2

(12) United States Patent
Hove et al.

(10) Patent No.: US 11,999,579 B2
(45) Date of Patent: Jun. 4, 2024

(54) TILT HOISTS AND LUMBER UNSTACKING SYSTEMS

(71) Applicant: USNR, LLC, Woodland, WA (US)

(72) Inventors: Darren Hove, Vernon (CA); Larry Petryshen, Salmon Arm (CA); Kenneth Neil Stokes, Enderby (CA); Thomas W. Congdon, Salmon Arm (CA)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 17/230,932

(22) Filed: Apr. 14, 2021

(65) Prior Publication Data
US 2021/0229938 A1    Jul. 29, 2021

Related U.S. Application Data

(62) Division of application No. 16/667,736, filed on Oct. 29, 2019, now abandoned.
(Continued)

(51) Int. Cl.
*B65G 59/08* (2006.01)
*B65G 7/08* (2006.01)
(Continued)

(52) U.S. Cl.
CPC ............... *B65G 59/08* (2013.01); *B65G 7/08* (2013.01); *B65G 59/026* (2013.01);
(Continued)

(58) Field of Classification Search
CPC ............ B65G 59/08; B65G 59/062; B65G 2201/0282; B65G 59/063; B65G 59/065;
(Continued)

(56) References Cited

U.S. PATENT DOCUMENTS 2,498,740 A * 2/1950 Miller .................... B65G 59/08
198/607
3,434,612 A * 3/1969 Schmidt ................. B66C 1/625
414/626
(Continued)

FOREIGN PATENT DOCUMENTS

CN        204625118 U  *  9/2015  ............. B66F 19/00

OTHER PUBLICATIONS

International Patent Application No. PCT/US2019/058645; International Preliminary Report on Patentability; dated Apr. 27, 2021.
(Continued)

*Primary Examiner* — Gregory W Adams
(74) *Attorney, Agent, or Firm* — Schwabe, Williamson & Wyatt, P.C.

(57) ABSTRACT

The present disclosure provides embodiments of tilt hoists and lumber unstacking systems with a rotation table, a tier alignment system, or both. The rotation table may include a base and a tilt frame supported on the base. The tier alignment system may include an alignment beam and an actuator operable to raise and lower one end of the alignment beam relative to the opposite end to thereby adjust the lateral slope of the spill edge. Optionally, a control system may include distance sensors to detect tiers of lumber as they approach the spill edge and a computer system configured to determine a difference between the lateral slope of the tier and the lateral slope of the spill edge. The computer system may also be configured to automatically adjust the slope of the spill edge to match the slope of the tier before the tier is spilled over the spill edge.

20 Claims, 23 Drawing Sheets

Related U.S. Application Data

(60) Provisional application No. 62/752,121, filed on Oct. 29, 2018.

(51) Int. Cl.
| | | |
|---|---|---|
| *B65G 59/02* | (2006.01) | |
| *B65G 59/06* | (2006.01) | |
| *B66C 13/22* | (2006.01) | |
| *B66F 7/22* | (2006.01) | |

(52) U.S. Cl.
CPC ............ *B65G 59/062* (2013.01); *B66C 13/22* (2013.01); *B66F 7/22* (2013.01); *B65G 2201/0282* (2013.01); *B65G 2814/037* (2013.01); *Y10S 414/103* (2013.01)

(58) Field of Classification Search
CPC ........ B65G 59/02; B65G 65/23; B66C 13/22; B66C 13/48; B66C 23/62; B65H 1/18; B65H 1/025; B65H 2404/623; B65H 3/128; B65H 3/242
See application file for complete search history.

(56) References Cited

U.S. PATENT DOCUMENTS

| | | | | |
|---|---|---|---|---|
| 3,565,266 | A | | 2/1971 | Buss et al. |
| 3,606,033 | A | * | 9/1971 | Barilla .................. B23Q 1/527 414/777 |
| 3,754,671 | A | * | 8/1973 | Walda .................... B65G 65/23 414/404 |
| 3,868,101 | A | * | 2/1975 | Nozaki .............. B23K 37/0452 414/766 |
| 4,699,564 | A | * | 10/1987 | Cetrangolo .......... B65G 47/248 125/35 |
| 4,710,089 | A | | 12/1987 | Schneider |
| 4,813,843 | A | * | 3/1989 | Gilmour .................... B66F 7/22 254/94 |
| 5,443,356 | A | * | 8/1995 | Naldi ....................... B65H 3/54 414/796.8 |
| 5,567,105 | A | * | 10/1996 | Williams ............... B65G 65/23 414/407 |
| 5,795,126 | A | * | 8/1998 | Newnes ................. B65G 59/08 414/796.2 |
| 5,879,129 | A | * | 3/1999 | Newnes ................. B65G 59/08 414/796.2 |
| 7,740,440 | B2 | * | 6/2010 | Hannebauer ........... B65G 59/08 414/795.8 |
| 8,388,297 | B2 | * | 3/2013 | Holloway ............... B21C 47/24 269/61 |
| 2001/0022424 | A1 | * | 9/2001 | Gerstenberger ......... B65H 1/18 271/167 |

OTHER PUBLICATIONS

European Patent Office—Extended European Search Report mailed Oct. 18, 2023, from EP Application No. 19878501.6, 6 pages.
European Patent Office—Supplemental European Search Report mailed Nov. 8, 2023, from EP Application No. 19878501.6, 1 page.

* cited by examiner

TILT HOISTS AND LUMBER UNSTACKING SYSTEMS

RELATED APPLICATIONS

This application is a division of U.S. patent application Ser. No. 16/667,736 filed Oct. 29, 2019, which claims the benefit of U.S. Provisional Application No. 62/752,121 filed Oct. 29, 2018, both titled "Tilt Hoists and Lumber Unstacking Systems," the entire disclosures of which are hereby incorporated by reference.

TECHNICAL FIELD

The present disclosure relates to lumber production, and more specifically to apparatuses and systems for unstacking stacked lumber and methods of upgrading such apparatuses and systems.

BACKGROUND

Lumber production facilities produce finished lumber in stages by cutting logs into boards, drying the boards to a desired moisture content in a lumber kiln, and planing and trimming the dried boards to desired dimensions.

The green boards are typically arranged in stacks for drying. The stacks are formed by arranging green boards into single-layer mats, or tiers, and placing sticks between each tier with the sticks oriented perpendicular to the long axes of the boards. This arrangement allows air to flow through the stack during the drying process. After the boards are dried, the stack must be disassembled to send the boards to the planer.

Some lumber production facilities use a tilt hoist to disassemble stacks. Conventional tilt hoists have a fixed frame, a knee frame that pivots between a vertical position and an inclined position resting against a rear surface of the fixed frame, and knees that are movable along the primary knee frame. A letdown conveyor is positioned near the front end of the fixed frame. A stack of lumber is disassembled by placing the stack onto the knees, tilting the knee frame forward to tilt the stack, and raising the knees along the knee frame to move the stack upward and forward along the knee frame toward a spill edge, such as an uppermost edge of the knee frame or letdown conveyor frame. As the leading edge of each successive tier passes the spill edge, the tier spills onto the letdown conveyor.

If the lateral slope of a tier is parallel to the lateral slope of the spill edge, such that both sides of the tier (along the opposite ends of the boards) are the same vertical distance above or below the spill edge, the tier spills evenly onto the conveyor and the boards remain in a substantially transverse orientation relative to the direction of movement on the letdown conveyor. For example, if both the tier and the spill edge are perfectly horizontal, the tier spills evenly. But sawing deviation, missing sticks, sticks placed on edge, and other such factors can result in a mismatch between the lateral slope of a tier and the lateral slope of the spill edge. This mismatch allows one side of the tier to pass over the spill edge before the other. As the boards spill unevenly onto the conveyor, they may crash into equipment or one another. Thus, conventional tilt hoist systems require a human operator to visually monitor the lateral slope of the tier and adjust the lateral slope of the knees as needed to maintain the alignment with the spill edge.

In conventional beam-style tilt hoists, the knees are mounted on a beam and the lateral slope of the beam is adjusted by way of a chain that extends through the beam and is anchored at its opposite ends to the opposite sides of the knee frame. The human operator presses a jog button to actuate a cylinder that tightens the chain, thereby incrementally lifting one end of the beam relative to the other. Another button retracts the cylinder to loosen the chain.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
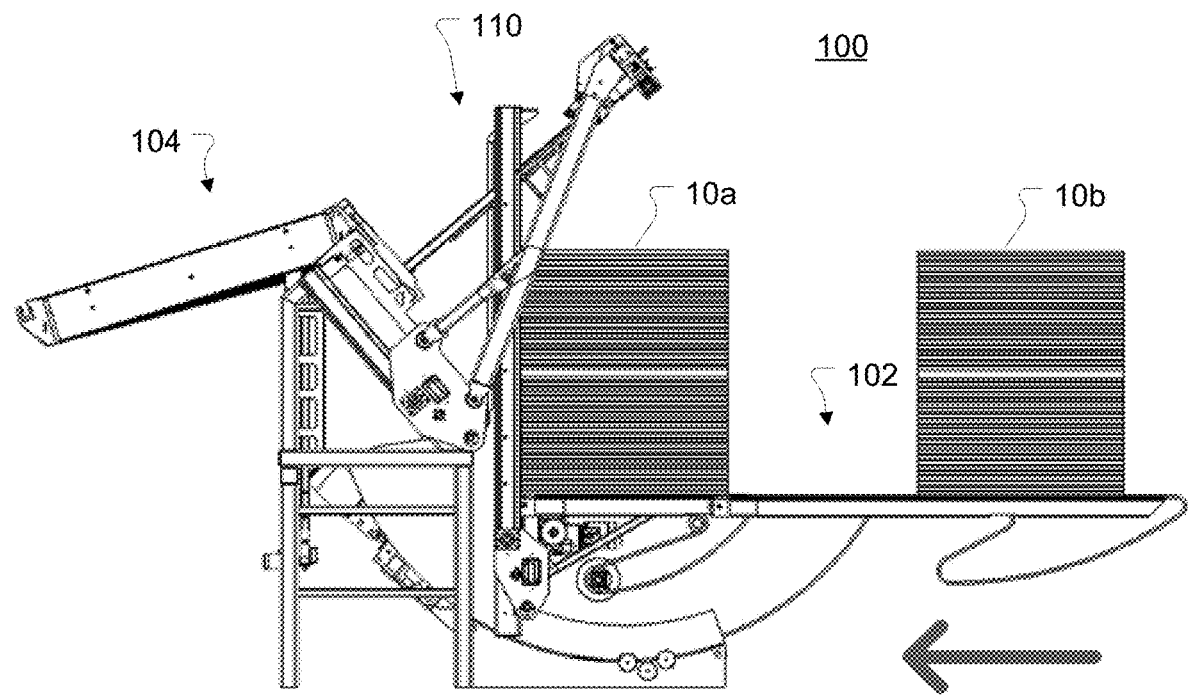
FIGS. 1A and 1B are side elevational views of a lumber unstacking system.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, a computing device may be endowed with one or more components of the disclosed apparatuses and/or systems and may be employed to perform one or more methods as disclosed herein.

The present disclosure provides embodiments of a tier alignment system for aligning a tier of lumber with the spill edge of a tilt hoist or letdown table, or for aligning the spill edge with the layer of lumber, and related apparatuses and methods. Some embodiments of a tier alignment system may include a table biasing assembly configured to adjust the lateral slope of a spill edge on a letdown table. Adjusting the lateral slope of the spill edge to match the lateral slope of the upper-most tier of lumber on a tilt hoist may help the tier of lumber to spill evenly onto the table. Optionally, the tier alignment system may further include a control system for manual and/or automatic control of the table biasing assembly and/or related devices.

The present disclosure also provides embodiments of a rotation table for tilting a stack, or package, of lumber. The rotation table may be used to rotate the package at or near the center of mass of the package, thereby reducing the required torque and/or enabling faster tilting of the package than prior tilt mechanisms. In some embodiments, the rotation table may have a base with an arcuate support surface and a tilt frame that is supported on the base and movable along the arcuate support surface to thereby tilt the tilt frame relative to the base. Optionally, the rotation table may have an electric drive and/or an associated control system.

The present disclosure also provides embodiments of tilt hoist devices and systems that include a tier alignment system, a rotation table, or both.

Optionally, some embodiments may further include a measurement system configured to determine the lateral slope of the upper-most tier of a lumber stack on a tilt hoist. The measurement system may include sensors and a control system configured to adjust the lateral slope of the tier (e.g., by controlling a knee biasing assembly of the tilt hoist) or the spill point (e.g., in embodiments with a tier alignment system as described herein) based at least on data received from the sensors.

Some embodiments of a tilt hoist may include the table biasing assembly, the rotation table, and a control system configured to control the table biasing assembly to thereby adjust the lateral slope of a spill edge on the letdown table. The control system may be configured for manual control by a human operator (e.g., via a joystick or other input device). Alternatively, the tilt hoist may also include a measurement system, and the control system may be configured to control the lateral slope of the spill edge automatically based on data received from the measurement system. Optionally, in either case, the control system may also be configured to control the rotation table.

Figure 1B:
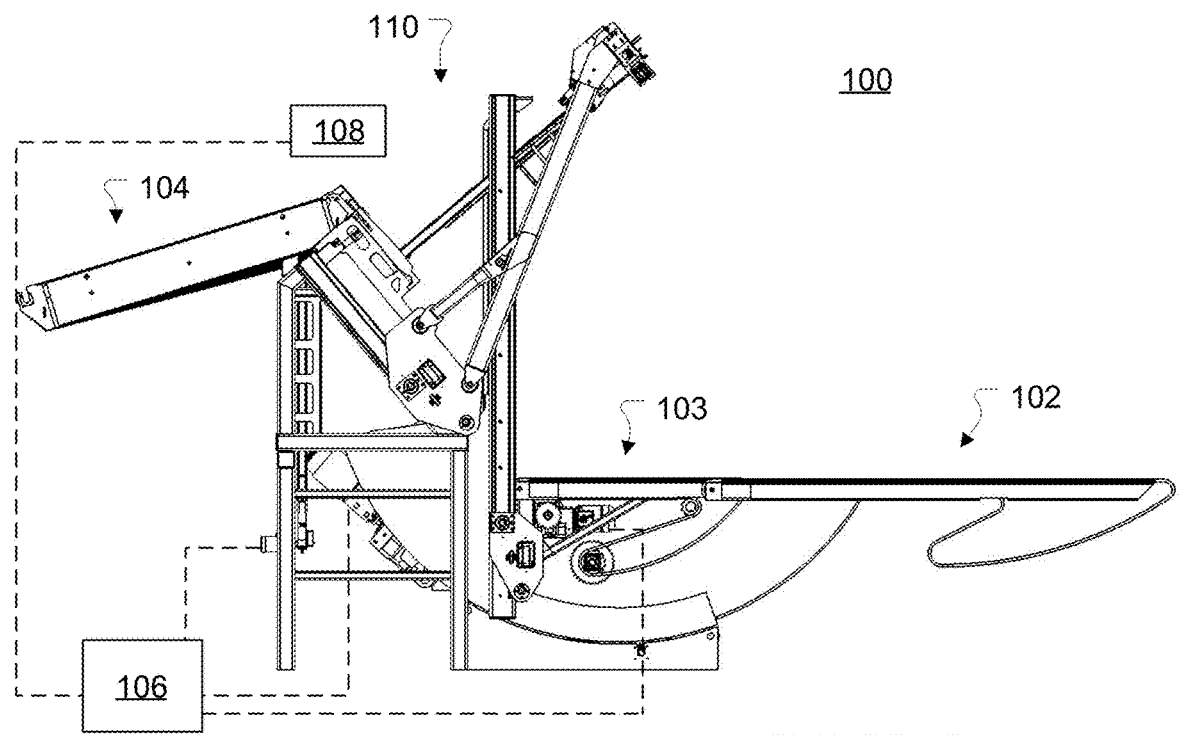

Referring now to the Figures, FIGS. 1A and 1B show a side elevational view of a lumber unstacking system 100. In various embodiments, lumber unstacking system 100 may include a tilt hoist 110. In some embodiments, lumber unstacking system 100 may also include an infeed 102 and/or an outfeed 104. Optionally, system 100 may include a control system, which may further include a computer system 106 and one or more sensors 108.

If present, infeed 102 may include one or more conveyors located at or near an upstream end of tilt hoist 110. Infeed 102 may be configured to move stacks of lumber 10a, 10b, or 'packages,' in a flow direction (arrow, FIG. 1A) to an upstream end of tilt hoist 110 (e.g., to the primary knees 103). In some embodiments, infeed 102 may include one or more chain or belt conveyors driven in rotation by an electric motor or by any other suitable drive.

Tilt hoist 110 may be configured to tilt the package toward outfeed 104 and to raise the package in the tilted orientation toward a spill edge of the tilt hoist. As each layer, or tier, of lumber on the package reaches the spill edge, the tier may spill over the spill edge onto an upstream end of the outfeed. Preferably, the tier spills over the spill edge onto the outfeed as a single-layer mat of lumber. If the package is a stack of dried lumber with sticks placed between the tiers, the sticks below the tier may fall through a gap between the outfeed 104 and the tilt hoist 110 as the tier spills onto the outfeed.

Outfeed 104 may also include one or more conveyors. In some embodiments, outfeed 104 may include generally parallel lugged chains that are driven in rotation by a corresponding drive to convey the lumber to a downstream end of the outfeed. If present, the lugs may be spaced apart such that the distance between lugs is equal to, or greater than, the width of the tier (i.e., from the leading end of the tier to the lagging end of the tier). Further details of outfeed 104 and tilt hoist 110 are provided below and illustrated in the accompanying Figures.

Figure 2A:
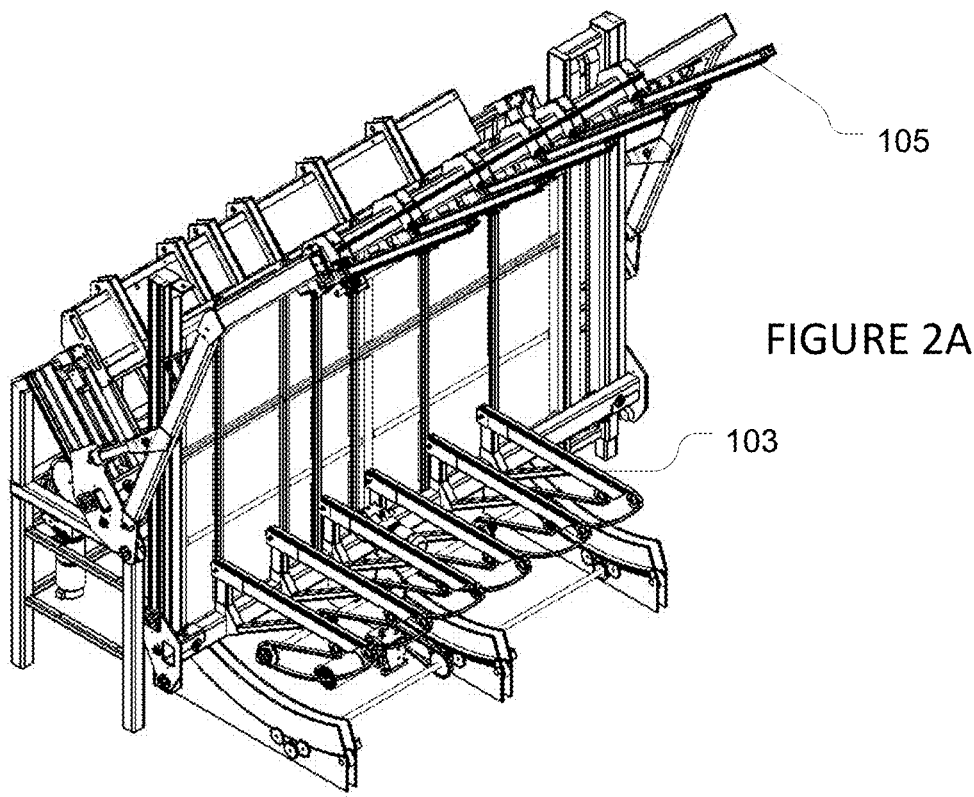
FIGS. 2A and 2B illustrate perspective views of a tilt hoist with a rotation table and a tier alignment system.
Figure 2B:
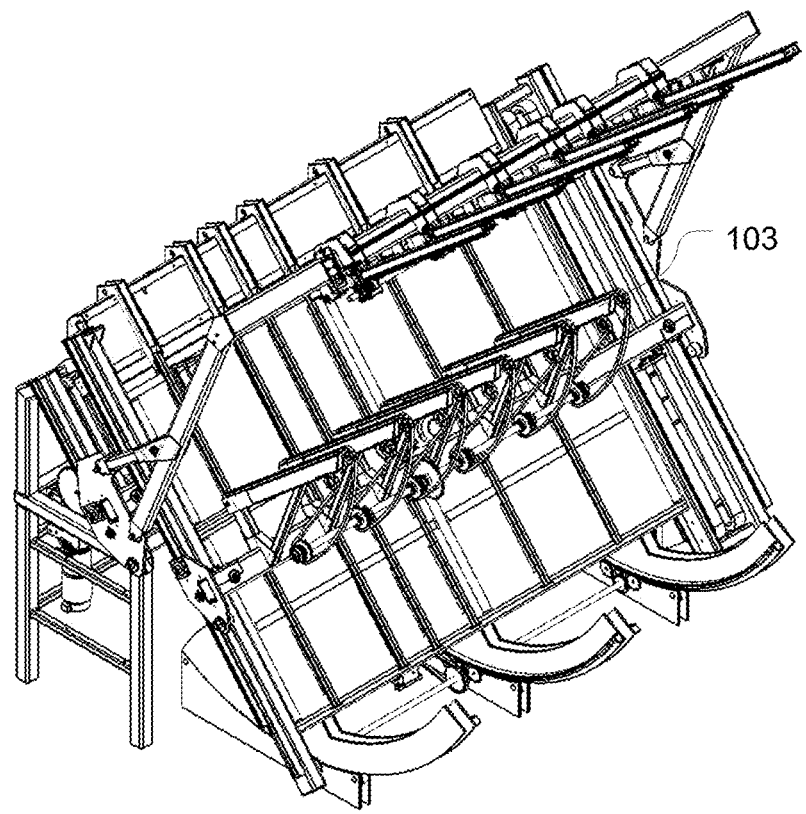
Figure 3:
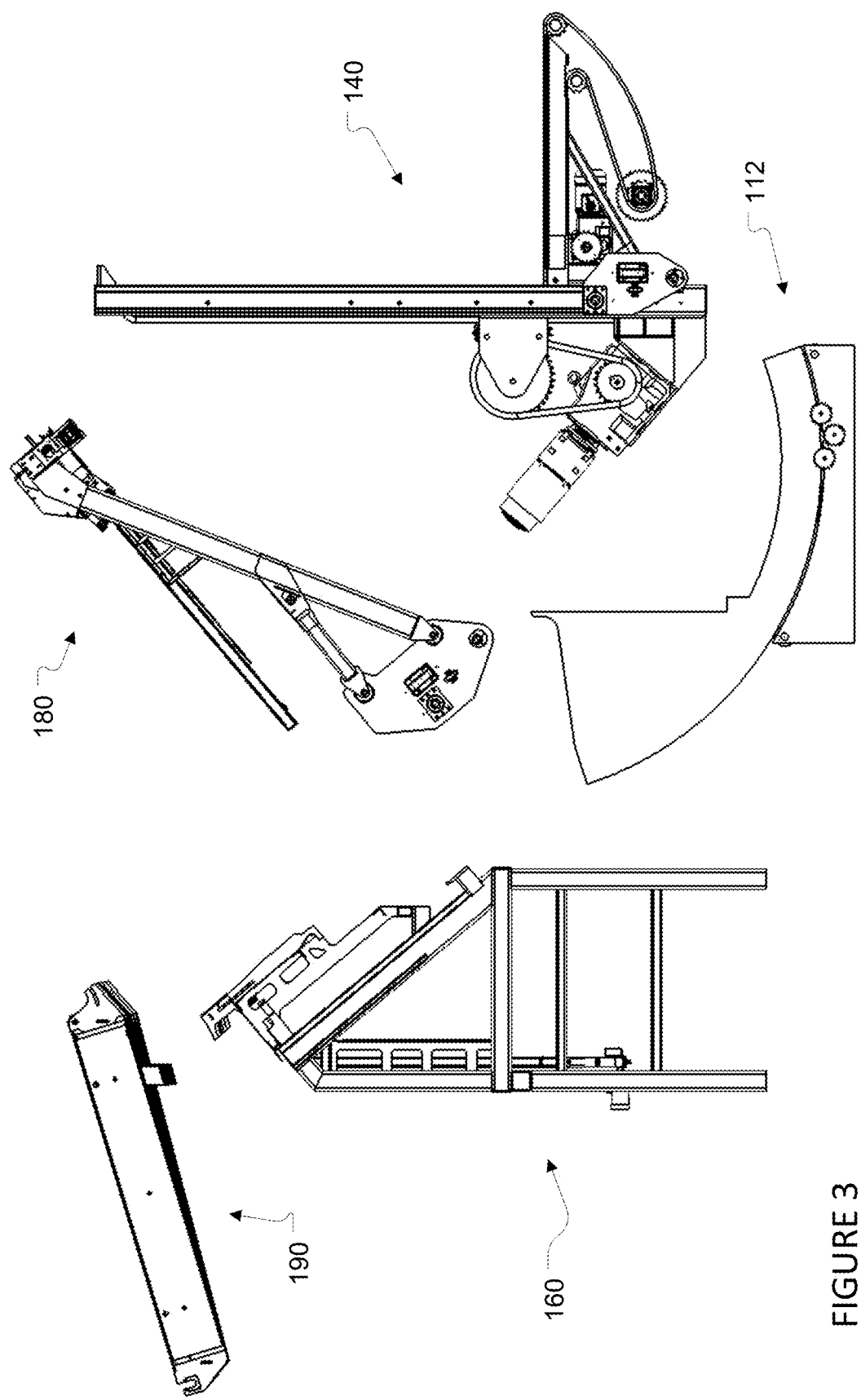
FIG. 3 illustrates a partially exploded view of the tilt hoist shown in FIG. 1B.

FIGS. 2A and 2B illustrate perspective views of tilt hoist 110 with the primary knees 103 raised (FIG. 2B) and lowered (FIG. 2A), and a partially exploded view of tilt hoist 110 is shown in FIG. 3.

Referring now to FIG. 3, in some embodiments tilt hoist 110 may include a tilt assembly 112, a platform assembly 140, and a frame assembly 160. Optionally, tilt hoist 110 may further include a secondary hoist assembly 180. If present, secondary hoist assembly 180 may include secondary hoist knees that are selectively movable from a starting position, which may be either above or below the primary hoist knees, to a transfer position to accept a package or some portion thereof (e.g., the bottom-most layers of lumber) from the primary hoist knees. The secondary hoist knees can be indexed upwardly to continue spilling the remaining tiers of lumber while the primary hoist knees are moved into position to accept the next package, allowing the tilt hoist 110 to be used to unstack successive packages in a continuous or semi-continuous manner. Other embodiments of tilt hoist 110 may lack a secondary hoist assembly. In some embodiments, tilt hoist 110 may include an outfeed (e.g., outfeed 104), or a portion thereof, with a set of conveyors 190. Alternatively, conveyors 190 may be part of outfeed 104, and may be omitted from tilt hoist 110.

Figure 4A:
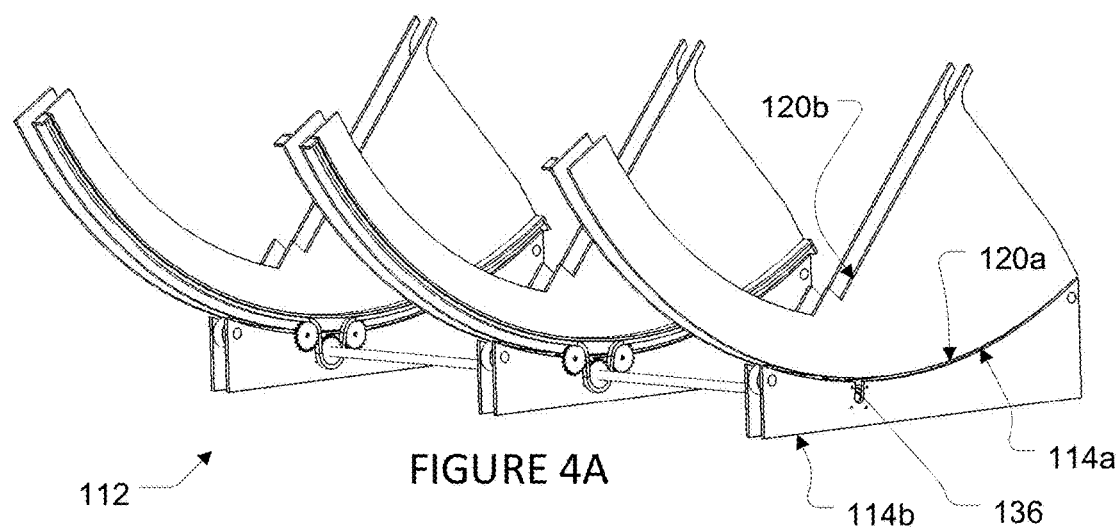
FIGS. 4A-H illustrate a tilt assembly as shown in FIG. 3.
Figure 4B:
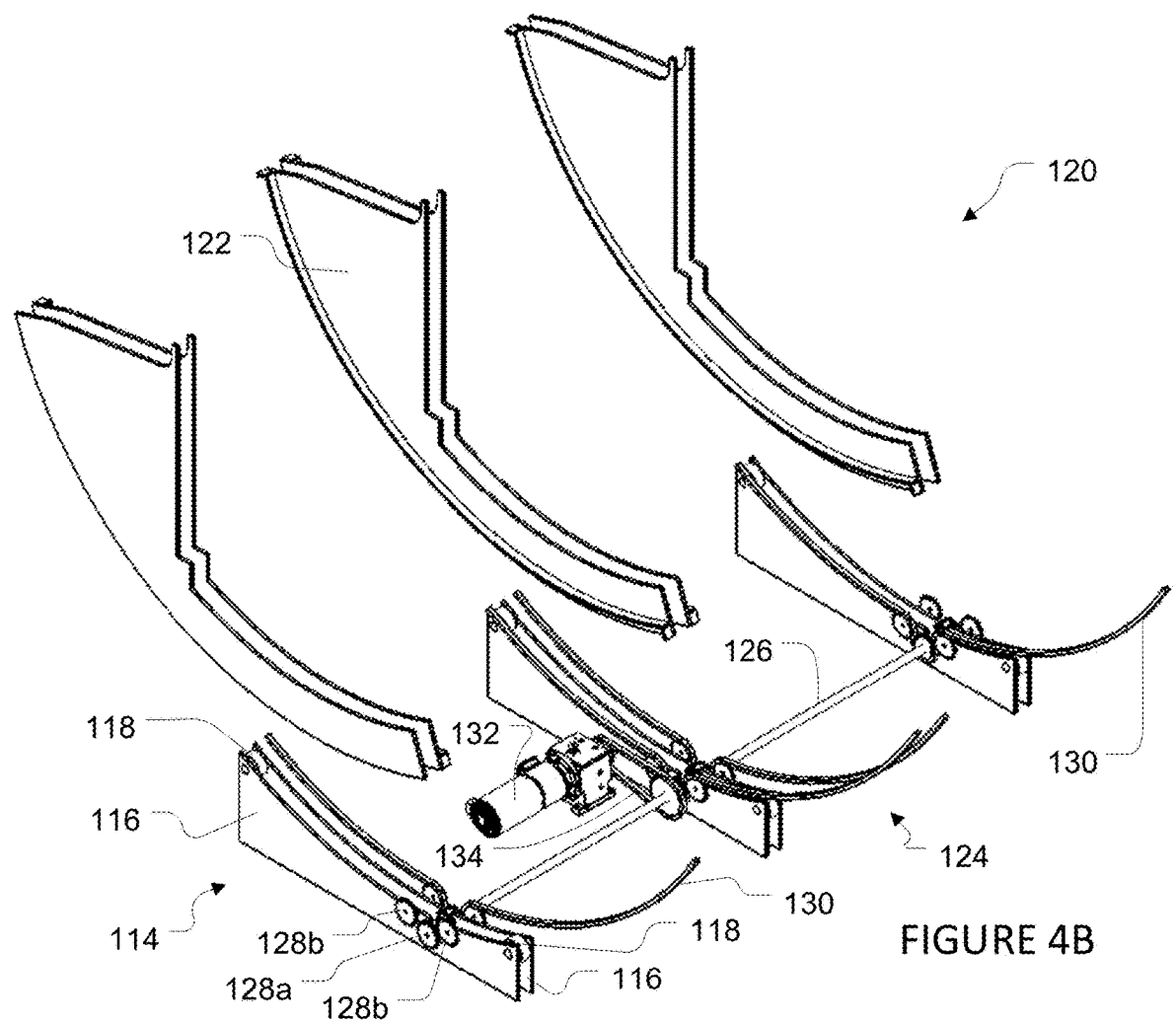

A perspective view of a tilt assembly 112 is shown by way of example in FIG. 4A, and a partially exploded view of the tilt assembly is shown in FIG. 4B. In some embodiments tilt assembly 112 (also referred to herein as a rotation table) includes a support base 114 and a tilt frame 120. Optionally, tilt assembly 112 may further include a drive system configured to move tilt frame 120 relative to support base 114.

Figure 4C:
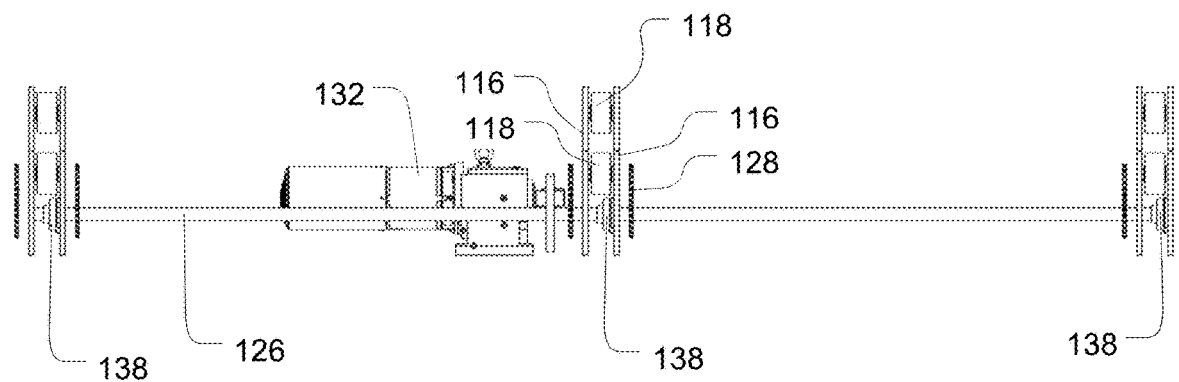
Figure 4D:
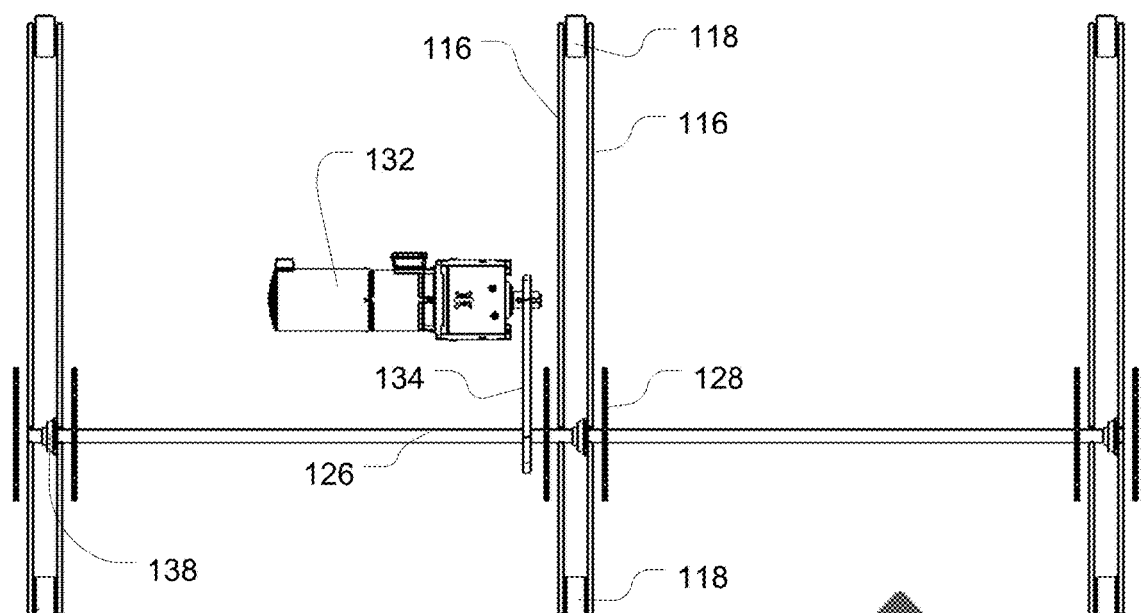
Figure 4E:
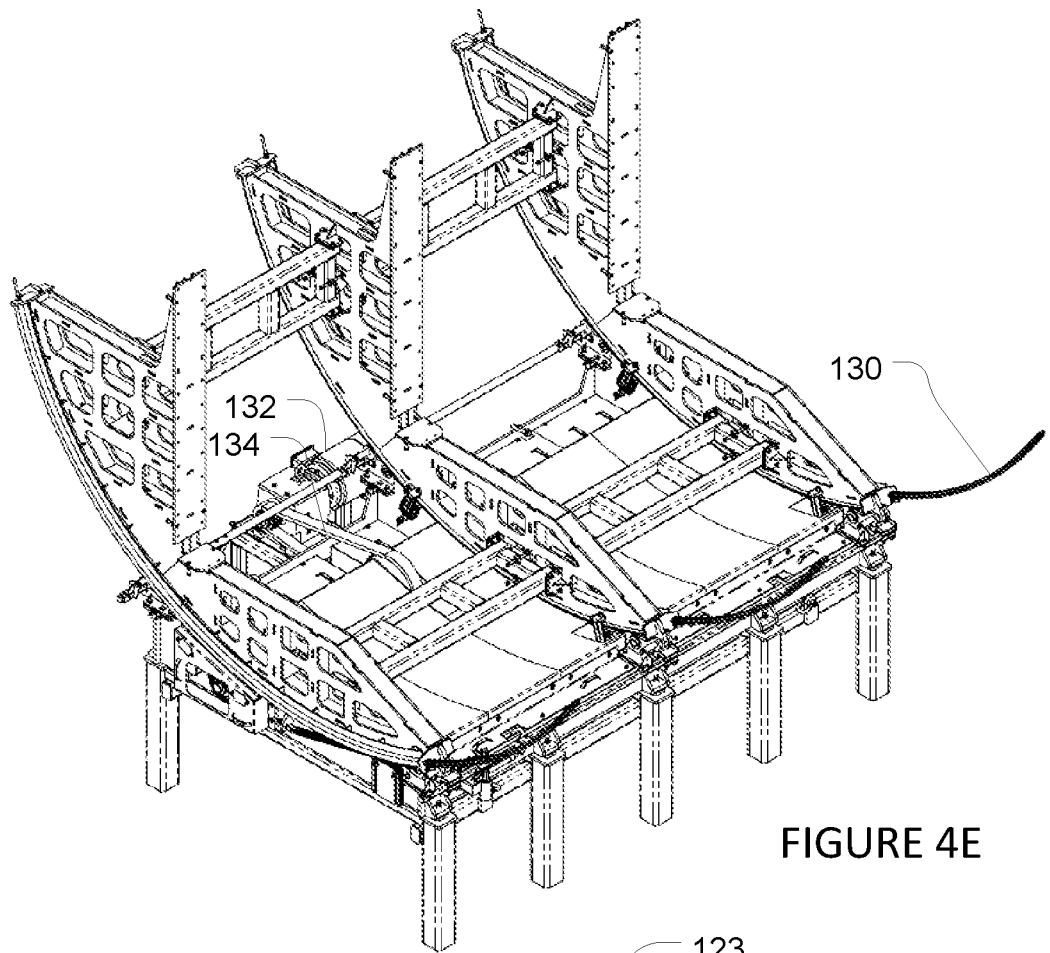
Figure 4F:
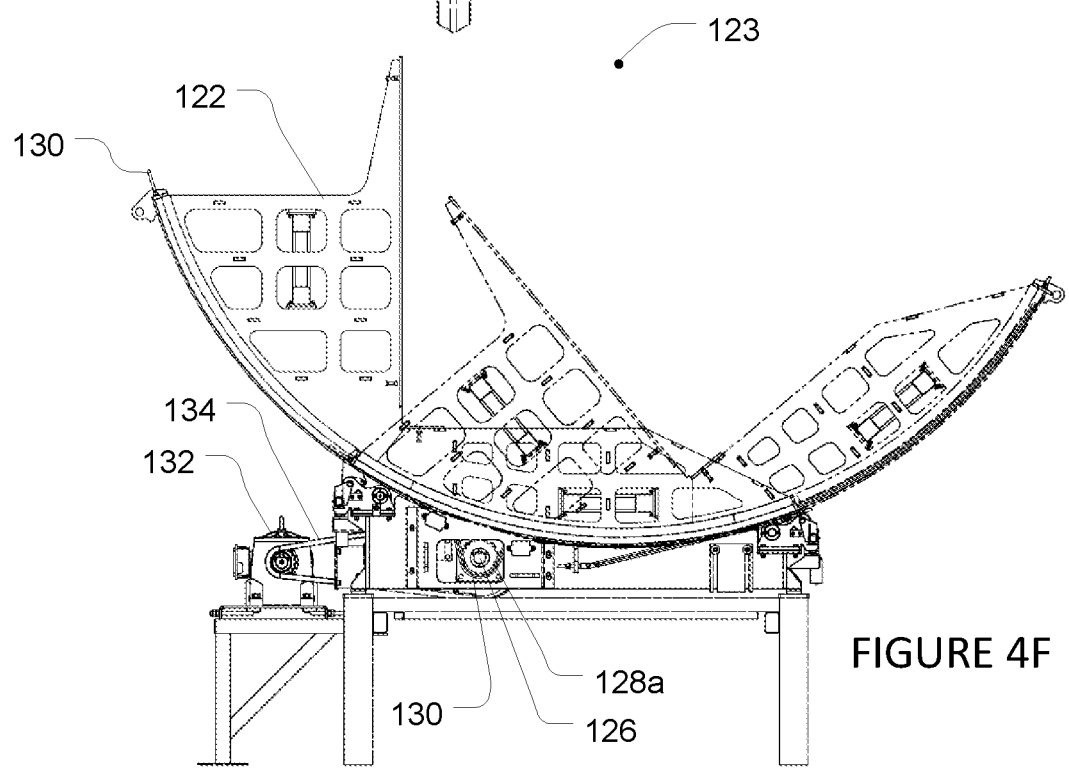
Figure 4G:
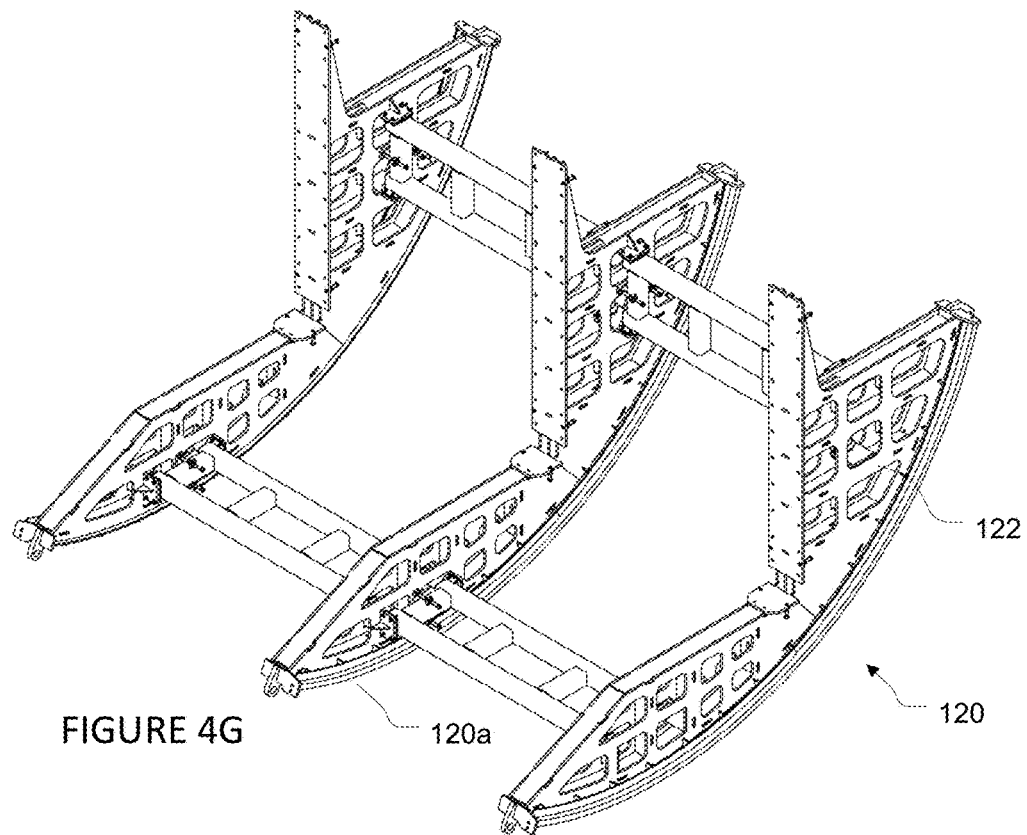
Figure 4H:
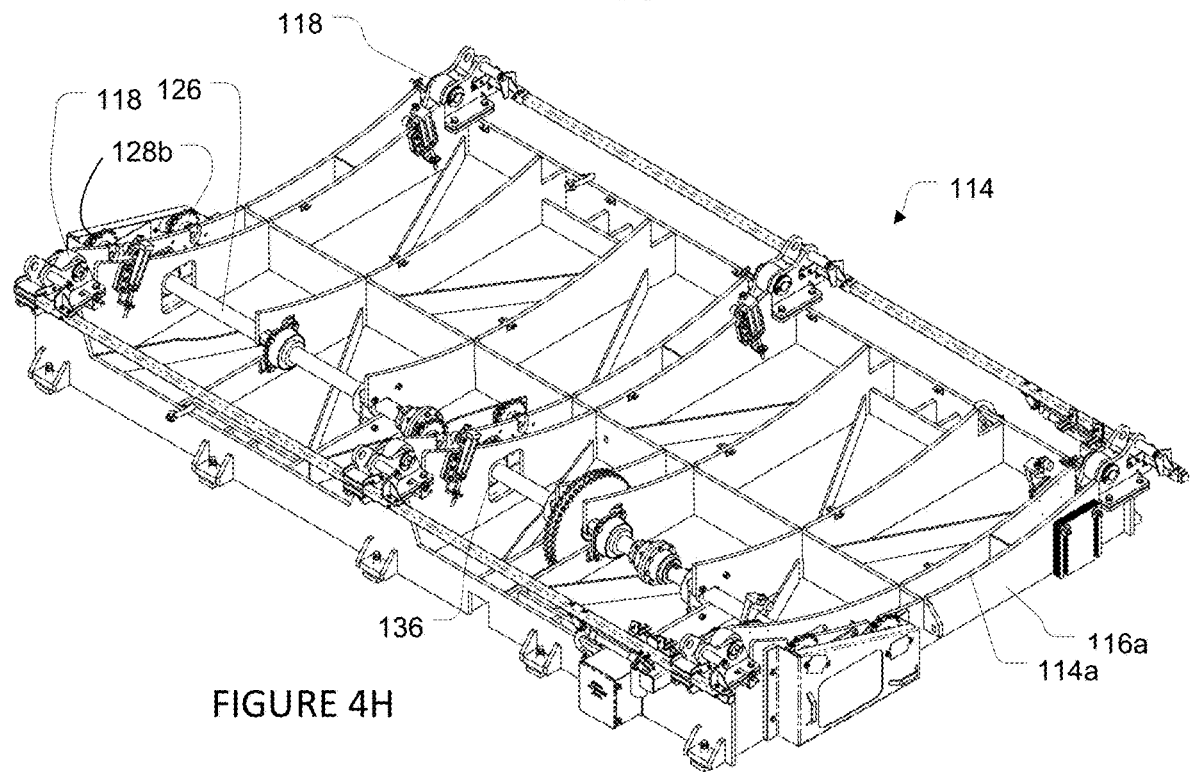

An example of a suitable drive system is described below (drive system 124). FIGS. 4C and 4D are front elevational and plan views, respectively, of the base 114. More detailed views are shown by way of example in FIGS. 4E-G. FIGS. 4E, 4G, and 4H are perspective views of a tilt assembly, tilt frame, and support base, respectively. FIG. 4F shows a side elevational view of a tilt assembly with the tilt frame in an upright position (shown in solid lines) and in a tilted/inclined position (shown in broken lines).

In various embodiments, base 114 may have a frame 116 and a plurality of contact members, such as rollers or bearing surfaces, coupled to the frame and configured to engage the lower surface of tilt frame 120. In some embodiments base 114 may have an arcuate upper surface 114a. Base 114 may also have a lower surface 114b configured to support the base on an underlying surface, such as a floor. In the illustrated embodiment, the frame 116 of base 114 includes a plurality of plates 116a, each with an arcuate upper surface, spaced apart at intervals across the flow direction. In some embodiments plates 116a may be arranged in pairs, with the plates of each pair spaced apart by a gap, and the pairs spaced apart at intervals across the flow direction. In this example the contact members of base 114 are rollers 118. The rollers 118 may be rotatably coupled to some or all of the plates such that the rollers are rotatable about respective rotational axes that are normal to the plates. The rollers 118 may be positioned along the arcuate upper surface of the respective plates 116a to support the tilt frame 120 thereon. For example, if plates 116a are arranged in pairs, a roller 118 may be retained between each pair of plates at the upstream end, and another roller 118 at a downstream end, of each pair of plates and/or at the upstream and downstream ends of their respective arcuate upper surfaces. Other numbers and arrangements of rollers 118 are also possible.

Figure 5A:
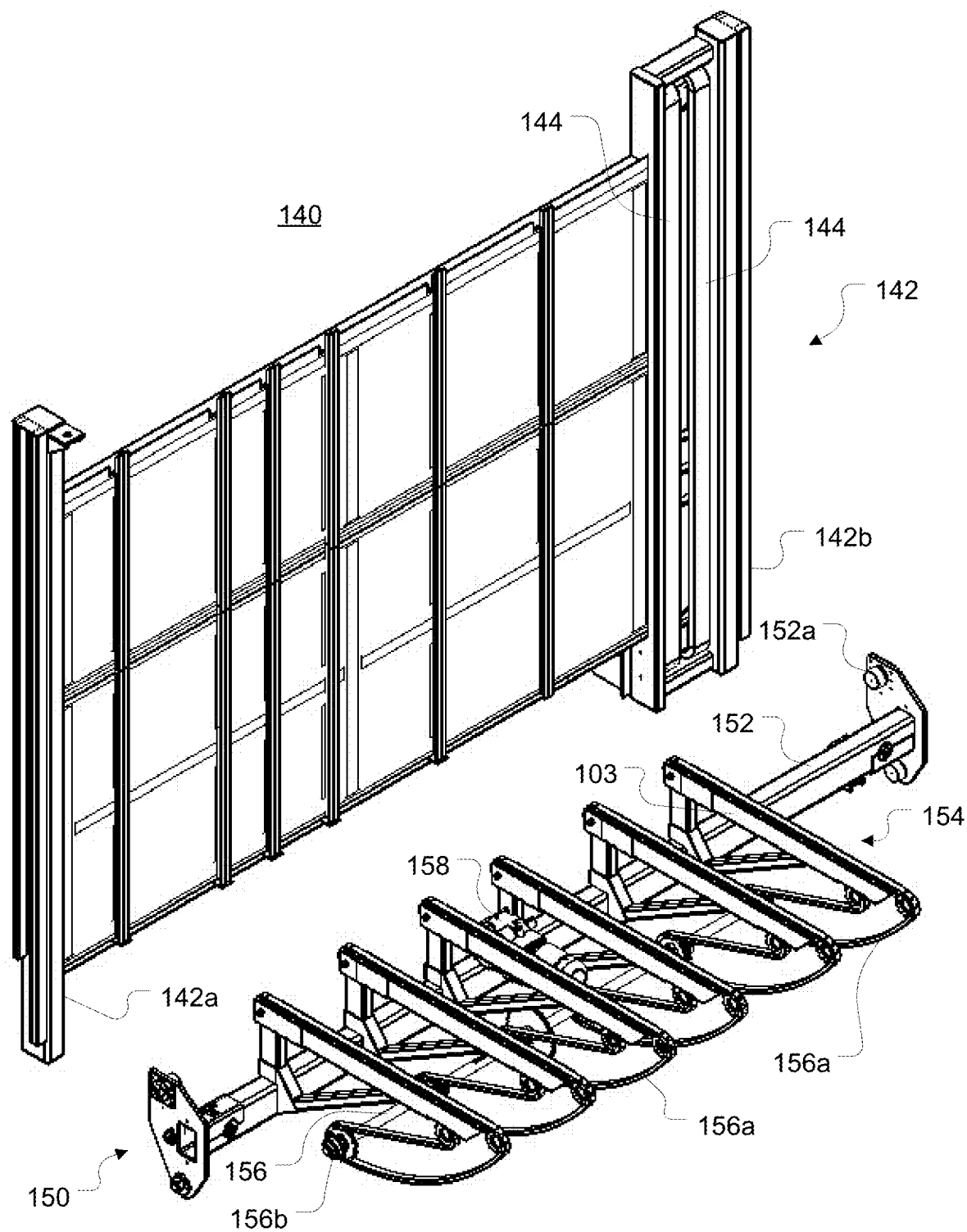
FIGS. 5A-D illustrate components of a platform assembly and a tilt assembly as shown in FIG. 3.
Figure 5B:
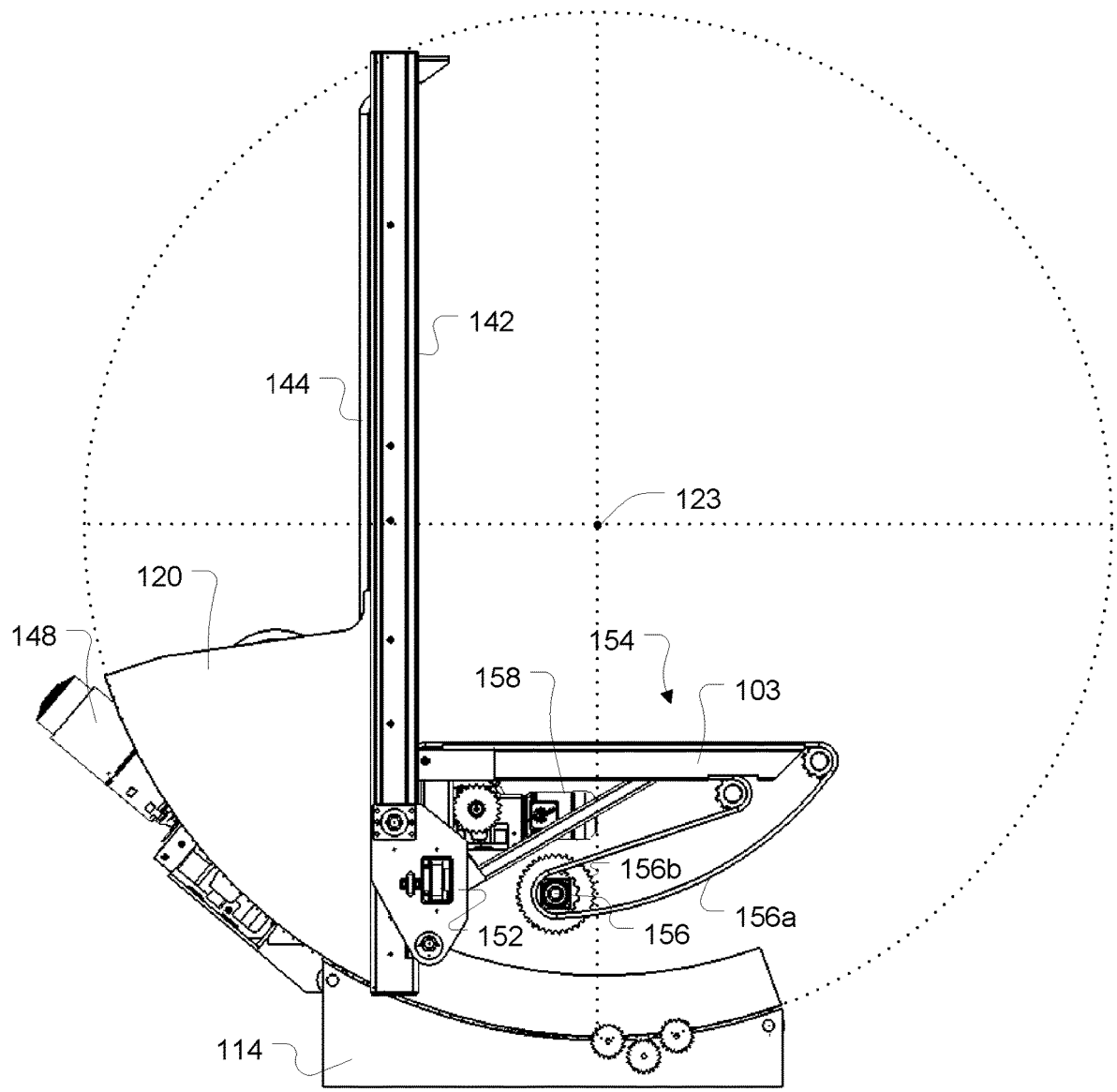

Tilt frame 120 may have an arcuate lower surface 120a shaped to complement the curvature of the arcuate upper surface 114a of base 114 and/or to enable tilting of the tilt frame 120 about the desired axis of rotation 123 (FIGS. 4F, 5B). In some embodiments, tilt frame 120 may include a plurality of plates 122 or pairs of plates 122, each with a respective arcuate surface, and the arcuate surfaces may collectively form the arcuate lower surface 120a. Alternatively, arcuate lower surface 120a may be formed in some other manner, such as by coupling a curved sheet of metal, plastic, or other material to all of the plates 122 to form a single continuous arcuate surface, or coupling multiple sheets of material to respective groups of the plates to form multiple arcuate surfaces. The plates 122 may be spaced apart at intervals across the flow direction. Again, in some embodiments the plates 122 may be arranged in pairs. Alternatively, in other embodiments plates 116a and/or plates 122 may be arranged in any other suitable manner. Plates 122 may have upper and/or front surfaces 120b shaped to engage, or otherwise configured to be coupled with, a portion of platform assembly 140. For example, surfaces 120b may have generally linear portions shaped to fit corresponding portions of the platform assembly 140 (e.g., the platform). Optionally, plates 122 (or pairs of plates 122) may be positioned above and generally in alignment with a corresponding plate 116 (or pair of plates 116a).

Other embodiments may lack rollers 118. For example, in some embodiments the contact members may be arcuate bearing surfaces shaped to slideably engage corresponding arcuate portions of the lower surface of the tilt frame 120, such that the tilt frame 120 is in sliding engagement with the base 114 along the respective arcuate surfaces. In that case, a low-friction substance (e.g., grease) or material, or other suitable means of reducing friction between surfaces, may be used to aid in the motion of tilt frame 120 relative to base 114.

Drive system 124 may include a shaft 126, sprockets 128, chains 130, and a drive 132. Shaft 126 may be disposed through the plates 116a of the base 114. For example, shaft 126 may be disposed through slots 136 (FIG. 4A, 4H) that are open to the arcuate upper surfaces of the plates 116a. The shaft 126 may be oriented perpendicular to the direction of flow (arrow, FIG. 4D) and/or substantially normal to the plates 122. Sprockets 128 may be coupled to some or all of the plates. At least some of the sprockets may be mounted to shaft 126. For example, shaft 126 may be rotatably coupled to some or all of the plates 122 by suitable means. For example, bearings 138 (e.g., ball bearing flanges or other bearings) may be fastened to some of the plates 122 with bolts or other fasteners (FIG. 4C). In that case, shaft 126 may be disposed through the bearings 138, and sprockets 128a may be mounted to the shaft 126 (FIGS. 4B, 4C). Optionally, additional sprockets 128b may be rotatably mounted to some or all of the plates 122 (e.g., upstream and/or downstream of corresponding sprockets 128a). In the illustrated example, bearings 138 are disposed between pairs of plates 122 and coupled to the inner face of one of the plates, shaft 126 is disposed through the bearings 138, and sprockets 128 are arranged along the outer faces of the plates. However, other configurations are also possible.

The sprockets 128 at each location may be configured and arranged to engage a corresponding chain 130. Each chain 130 may be fixed at its opposite ends to the a respective one of the plates 122. For example, in some embodiments each chain 130 may be fixed at its opposite ends to the forward and rearward ends of the respective plate 122, near the ends of the arcuate lower surface of the plate. Each chain 130 may be engaged by a respective set of the sprockets 128 positioned along the side of a respective plate 122. Drive 132 may be coupled to shaft 126 directly (e.g., in axial alignment with shaft 126) or indirectly via a belt or chain 134, or by other means. Regardless, drive 132 may be operable to drive shaft 126 in rotation. In some embodiments, drive 132 is an electric motor operable to drive shaft 126 in opposite rotational directions. However, other types of drives may be used instead.

The tilt assembly 112 may operate generally as follows. Drive 132 may be operated to rotate shaft 126 in a first rotational direction to thereby rotate sprockets 128. The rotation of sprockets 128 drives the respective chains 130 in a corresponding direction, which moves the arcuate lower surface of tilt frame 120 along the contact members (e.g., on rollers 118 or bearing surfaces) of base 114. Drive 132 may be operated in the first rotational direction and in an opposite second rotational direction to move the tilt frame 120 between an upright position (see e.g., FIG. 2A) and a tilted position (see e.g., FIG. 2B), relative to base 114. Rollers 118, if present, may aid smooth motion of the tilt frame assembly 120 relative to the base 114. For clarity, in FIG. 4B, the plates 122 are shown in the upright position, but the positions of the chains 130 indicate the tilted position.

Figure 5C:
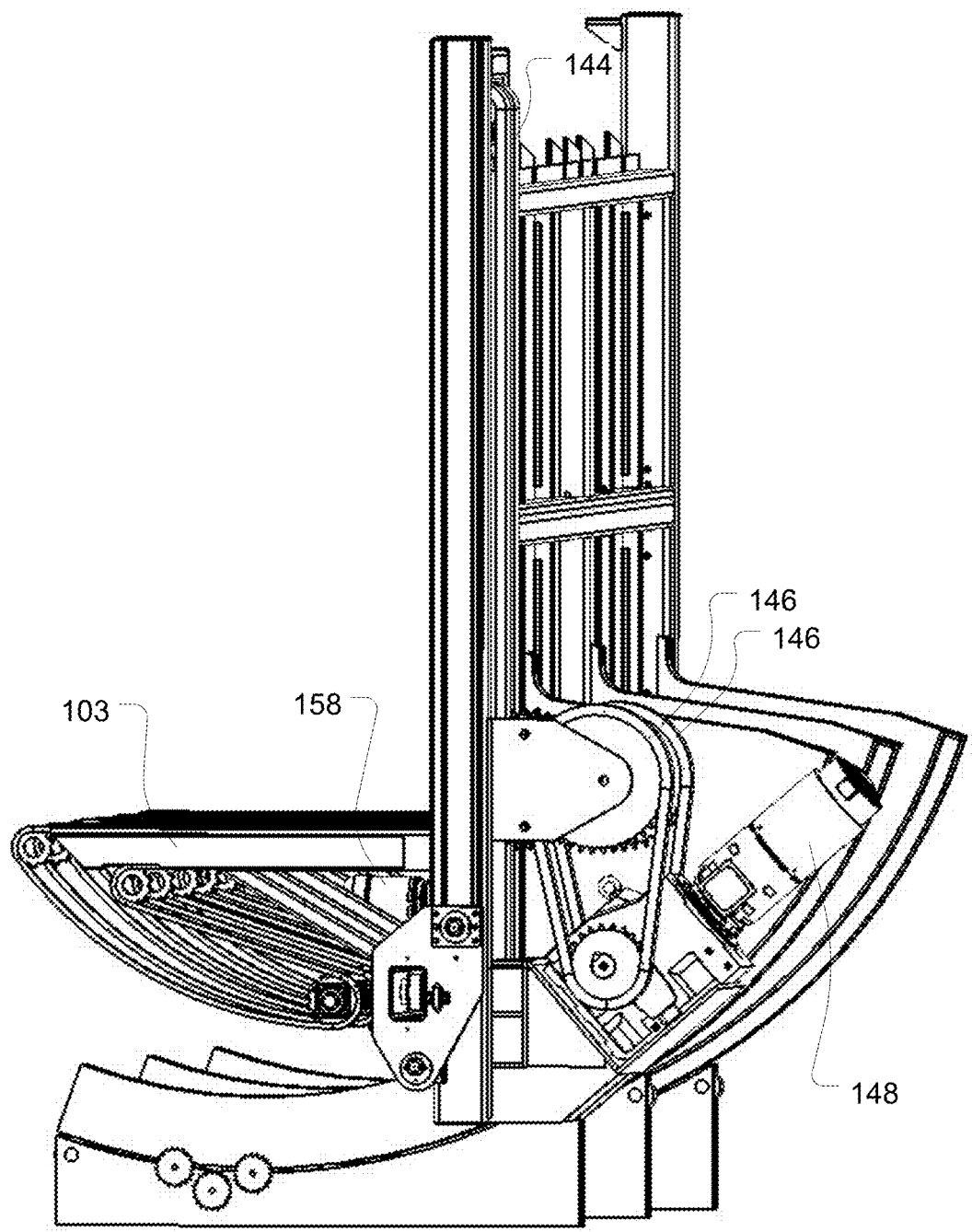
Figure 5D:
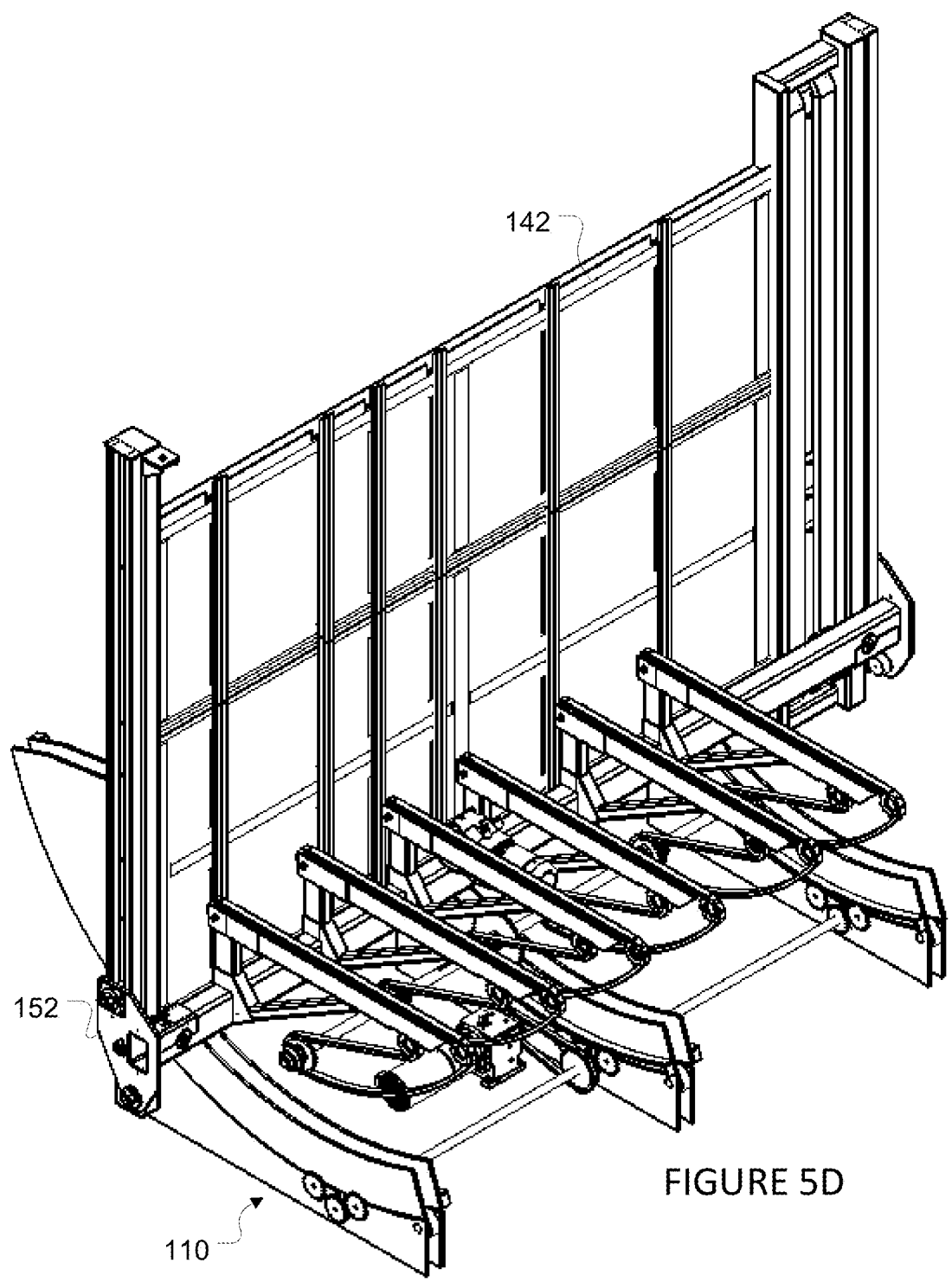
Figure 5E:
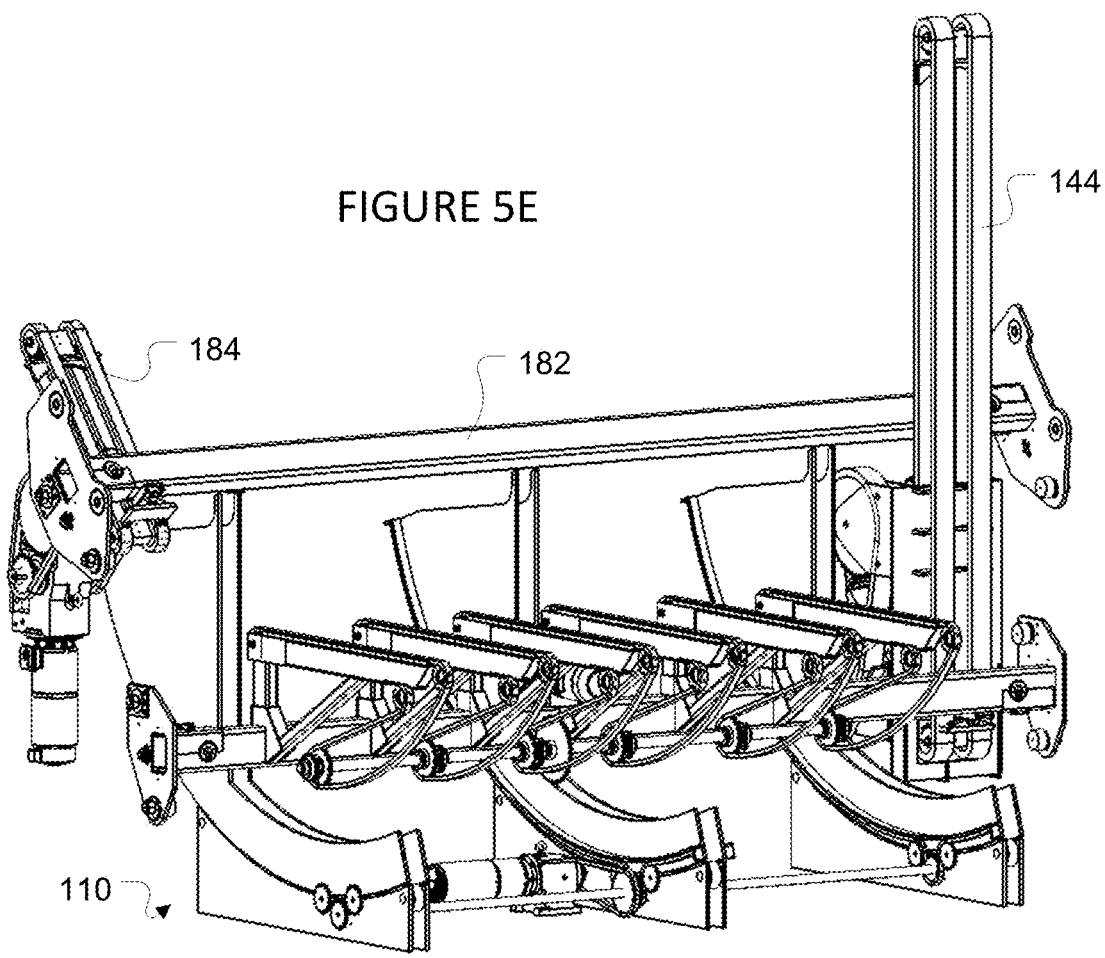
FIGS. 5E-G illustrate components of a secondary hoist assembly, a platform assembly, and a tilt assembly as shown in FIG. 3.
Figure 5F:
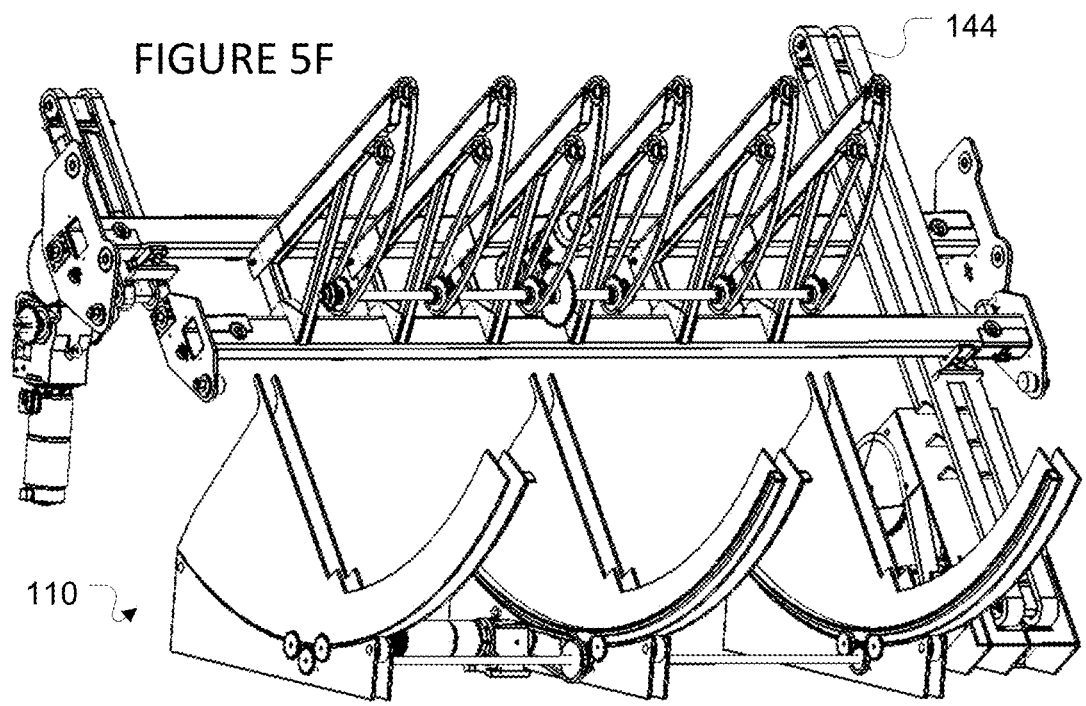

FIG. 5A illustrates a partially exploded view of platform assembly 140. FIGS. 5B and 5C-5D show side elevational and perspective views, respectively, of platform assembly 140 in combination with tilt assembly 112. Additional features of platform assembly 140 are shown in FIGS. 5E and 5F, with some components removed for clarity.

In various embodiments, platform assembly 140 may include a platform 142 and a primary knee assembly 150 (FIG. 5A). As best shown in FIGS. 5B-D, platform 142 may be coupled to, and supported on, tilt frame 120. Primary knee assembly 150 may be movably coupled to platform 142.

In various embodiments, platform 142 may include beams, plates, and/or other structural components arranged to form a generally flat support surface with an upstream face, a downstream face, and opposite lateral ends 142a and 142b. Platform assembly 140 may further include one or more hoist chains 144, one or more drive chains 146, and a drive 148. Optionally, platform 142 and/or platform assembly 140 may be components of a conventional tilt hoist.

Primary knee assembly 150 may include a beam 152 and a plurality of primary knees 103 mounted to the beam 152. Typically the beam 152 is oriented transverse to the flow path, and the primary knees 103 are mounted to the beam 152 at intervals and oriented generally parallel to the flow path. Collectively, the primary knees 103 form a support surface to support a package (a stack of lumber).

Optionally, in some embodiments the primary knee assembly 150 may further include a plurality of endless members 156a (e.g., endless chains or belts) coupled with respective primary knees 103 and a shaft 156 to form conveyors 154. Shaft 156 may be mounted to the beam 152 and oriented generally parallel to the beam 152. Preferably the shaft 156 is positioned below the primary knees 103. The chains 156a may be engaged by corresponding sprockets 156b arrayed along shaft 156. A drive 158 may be operatively coupled to shaft 156 (e.g., by a drive chain or belt, or coupled directly to one end of the shaft). Preferably the drive 158 is supported by beam 152 below the primary knees (see e.g., FIGS. 5B and 5C). Drive 158 may be an electric motor. Alternatively, drive 158 may be any other type of motor or device suitable for use to rotate the shaft 156. Regardless, drive 158 may be operated to drive shaft 156 in rotation to thereby move a package in the flow direction from an upstream location (e.g., infeed 102) to a desired position on primary knees 103 (e.g., to move the package into abutment with platform 142.

In other embodiments, the primary knee assembly 150 lacks shaft 156, endless members 156a, sprockets 156b, and drive 158.

In various embodiments, platform 142 may be coupled to tilt frame 120 (e.g., by welding or with bolts or other mechanical fasteners). The opposite ends of beam 152 may be slideably coupled to corresponding ends 142a and 142b of the platform 142 such that primary knee assembly 150 is movable, relative to platform 142, between a raised position and a lowered position. For example, rollers or pins 152a may be coupled to the ends of the beam 152 and accommodated within corresponding channels (or slide along corresponding surfaces) that extend, within or along the opposite ends 142a and 142b of the platform, from a lower portion to an upper portion of the platform. Beam 152 may be coupled with hoist chain(s) 144.

In operation, drive 158 may be operated to rotate shaft 156, thereby driving the chains 156a to move a package onto the conveyors 154. While the tilt frame 120 is being moved from the upright to the tilted position, or after the tilt frame has been moved to the tilted position, drive 148 may be operated to drive the hoist chain(s) 144 to thereby raise the primary knee assembly and the package supported thereon.

FIGS. 5E and 5F show the primary knee assembly 150 and the tilt assembly 112 in a resting position (FIG. 5E) and in a lifting position (FIG. 5F). In the resting position, the knee assembly is lowered to accept a package (e.g., from infeed 102) and the tilt frame 120 is in the upright position. In the lifting position, the knee assembly is raised and the tilt frame 120 is in the tilted position.

Although some embodiments of a tilt hoist include a primary knee assembly with integrated infeed conveyor chains (e.g., conveyors 154 with chains 156a), other configurations are also possible. For example, in some embodiments the tilt hoist may instead have a conventional primary knee assembly without integrated conveyors.

Figure 5G:
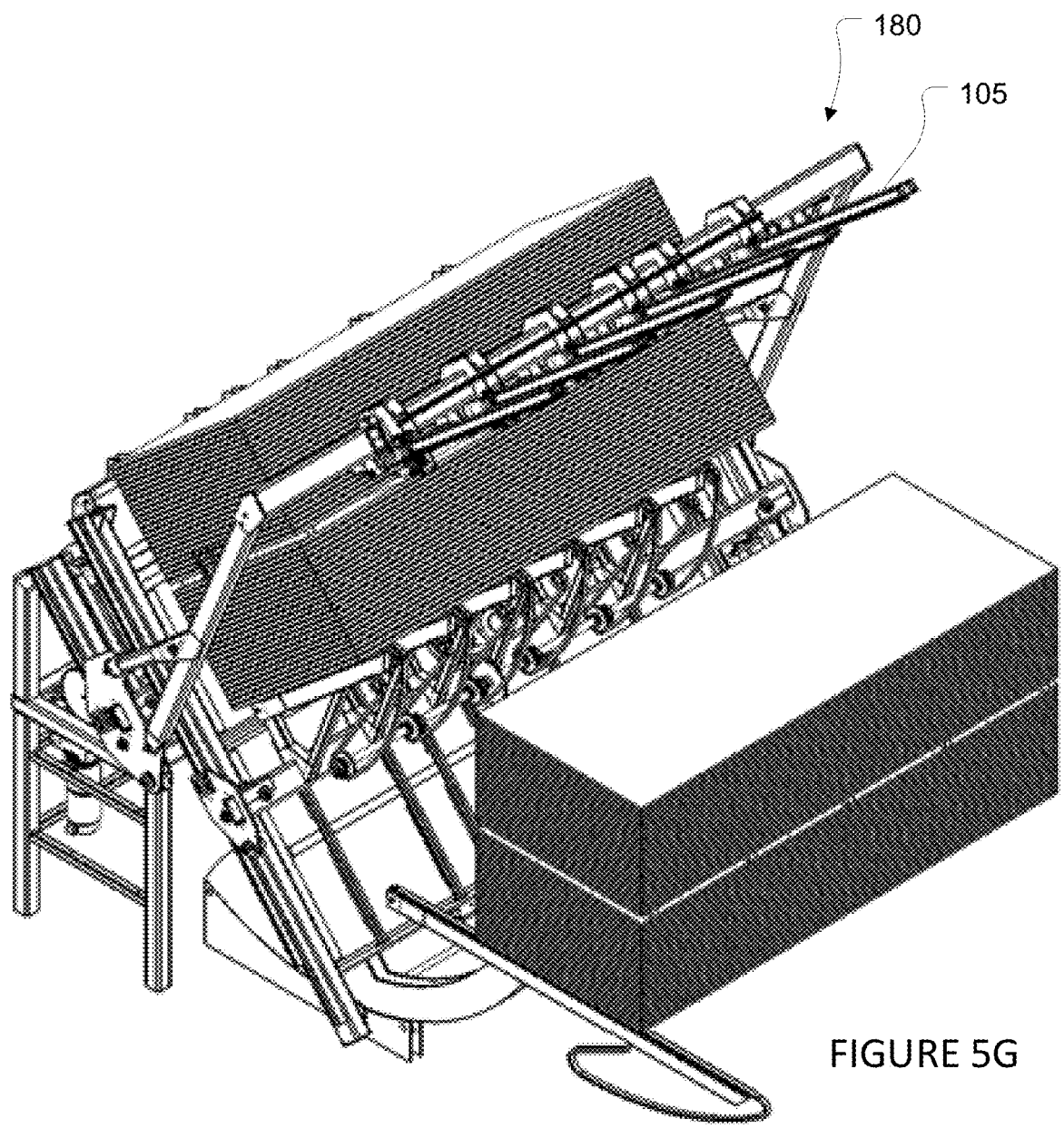

Optionally, in some embodiments the tilt hoist may include a secondary hoist assembly 180 (see e.g., FIG. 3). Secondary hoist assembly 180 may be any of any suitable type (e.g., a conventional secondary hoist assembly). While secondary hoist assemblies are well known in the art, and are therefore not discussed in detail herein, portions of a secondary hoist assembly 180 are shown for reference in FIGS. 5E-5G. As an example, the secondary hoist assembly may include a corresponding secondary hoist beam 182, secondary knees 105 supported by secondary hoist beam 182, secondary hoist chains 184, and a drive 186. In the illustrated embodiment, the hoist chains 144, drive chains 146, and drive 148 are located along one end of the platform assembly, and the secondary hoist chains 184 and drive 186 are located at the opposite end of the platform assembly. (Platform 142 and other components are omitted for clarity in FIGS. 5E-F.) Secondary hoist chains 184 may be coupled to a corresponding end of beam 182, and drive 186 may be operable to raise and lower the secondary hoist beam 182 and the forks supported thereon to accept a package from the primary hoist knees and to raise the package the remaining distance to the spill edge. This is merely one example of a secondary hoist assembly, and other configurations are also possible. For example, the secondary knees can either be mounted and extend from an overhead position or located under the tilted platform and extend from the underneath position. Other embodiments may lack a secondary hoist assembly.

Figure 6A:
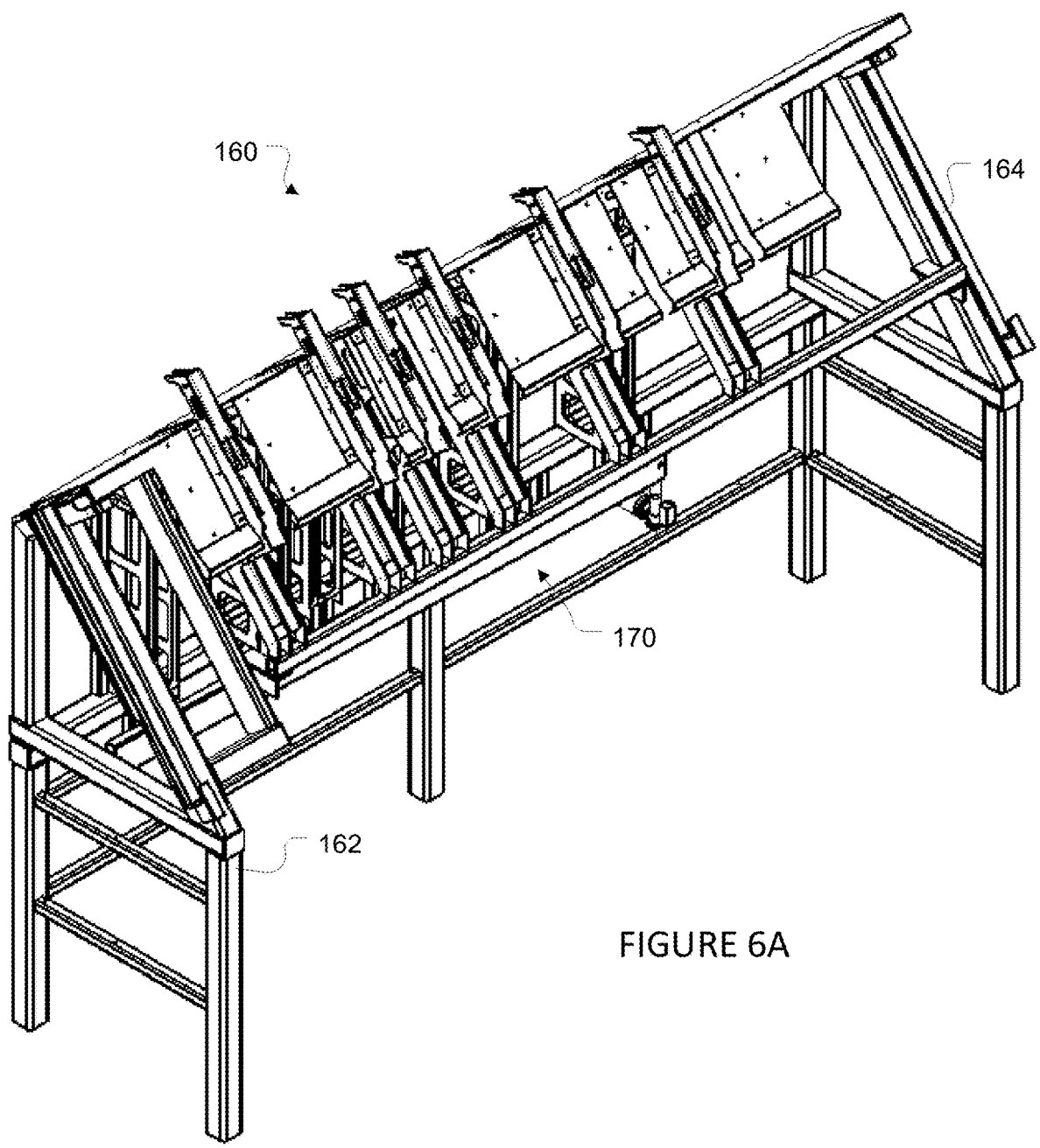
FIGS. 6A-6H illustrate frame assemblies and tier alignment systems.
Figure 6B:
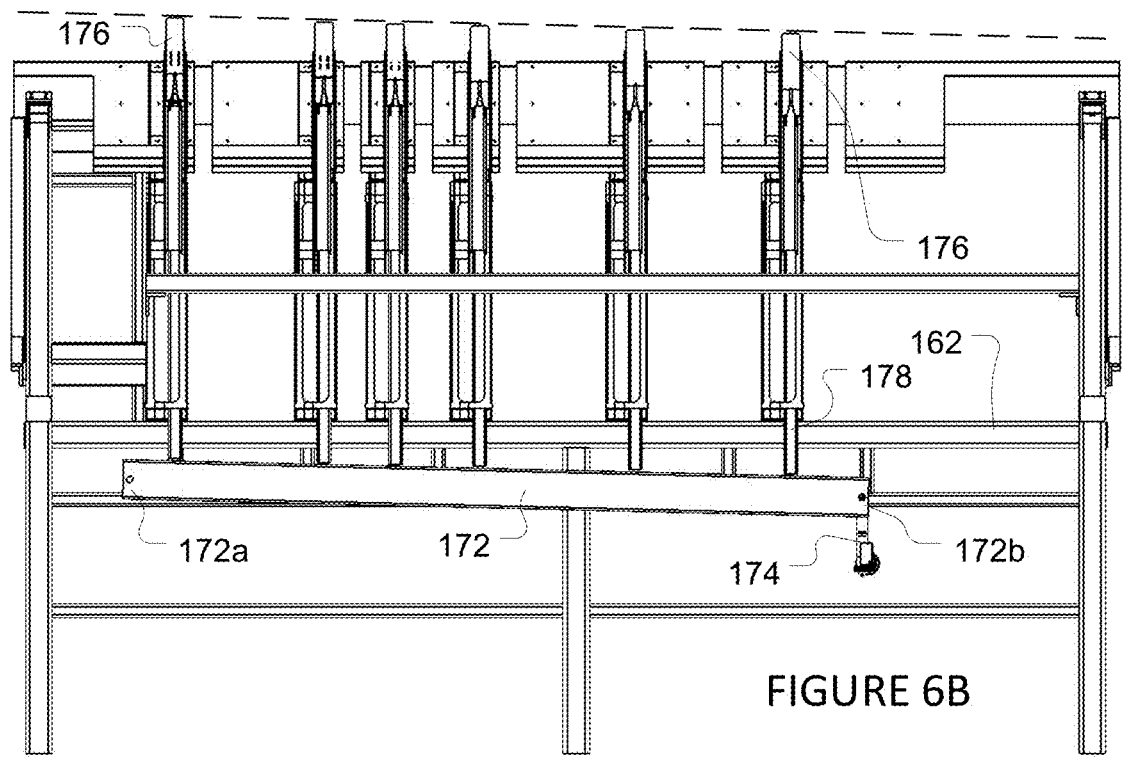
Figure 6C:
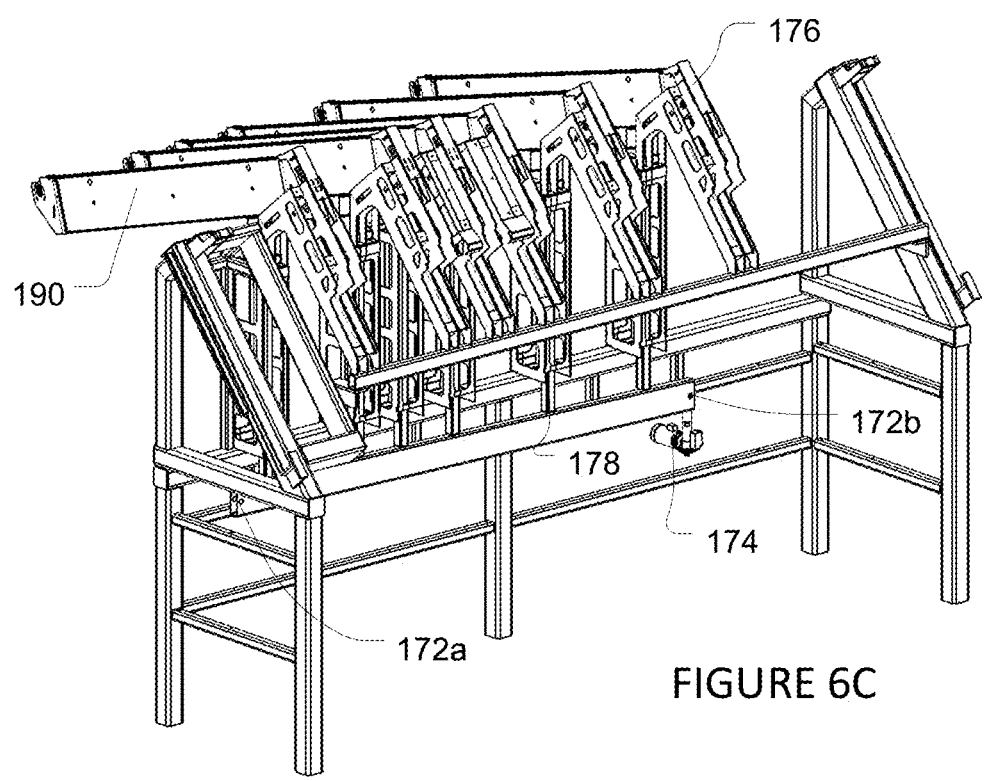
Figure 6D:
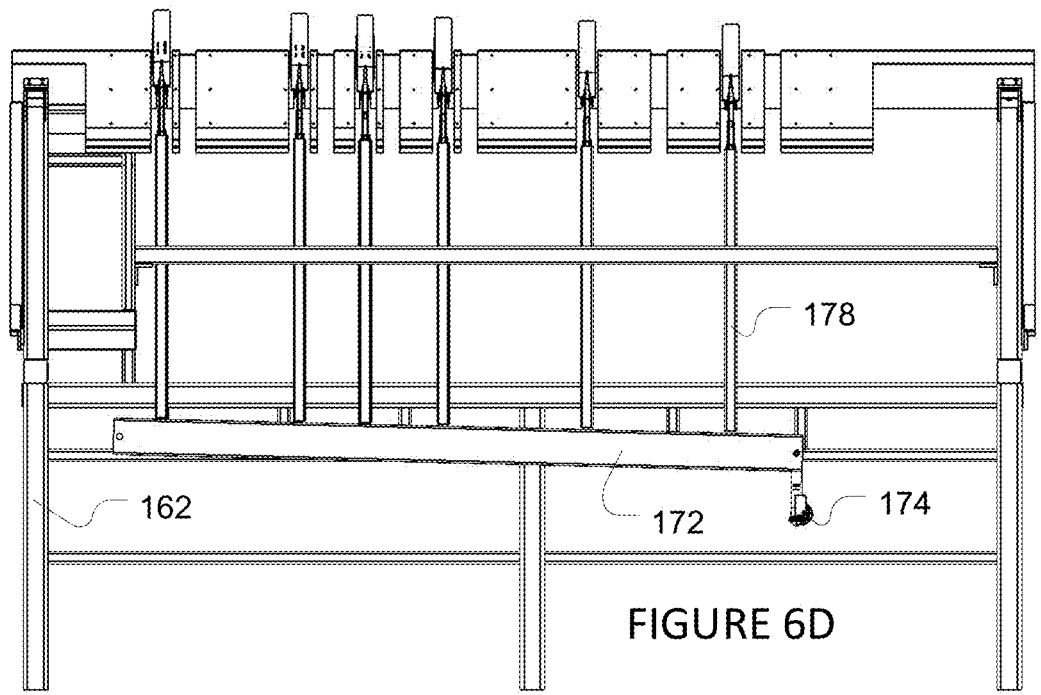

FIGS. 6A and 6B are perspective and rear elevational views, respectively, of a frame assembly 160. FIGS. 6B, 6C, and 6D are upstream perspective, rear elevational, and downstream perspective views of frame assembly 160 and conveyors 190. Some components are omitted for clarity in FIGS. 6C and 6D.

Referring first to FIG. 6A, the frame assembly 160 may include a support frame 162. Support frame 162 may include beams, braces, plates, and/or other structural members coupled together to form a framework with an inclined receiving surface 164 at an upstream end of the support frame, against which the platform 142 may rest or abut when in the tilted position.

In some embodiments, frame assembly 160 may further include a tier alignment system 170. Referring now to FIG. 6B, a tier alignment system 170 may include an alignment beam 172 and an actuator 174. In some embodiments, the tier alignment system and/or another portion of the frame assembly 160 (e.g., frame 162) may further include a plurality of spill arms 176. The uppermost edges of the spill arms 176 may define the spill edge, indicated by a broken line in FIG. 6B. In other words, the spill edge may be the top edge of the upstream-facing surface of each of the spill arms.

In some tier alignment systems, the alignment beam 172 may be positioned below an upper surface of the support frame 162 and extend across the flow direction. A first end 172a of the alignment beam 172 may be pivotably coupled to support frame 162. An opposite second end of alignment beam 172 may be coupled to an actuator 174, and actuator 174 may in turn be coupled to a corresponding portion of support frame 162. The actuator 174 may be operable to raise and lower the second end of the alignment beam 172 relative to the first end. Actuator 174 may be a linear actuator in some embodiments. Preferably, actuator 174 is an electric linear actuator (e.g., an electric cylinder). Alternatively, actuator 174 may be a hydraulic cylinder, a pneumatic linear actuator, or any other suitable type of actuator.

Figure 6E:
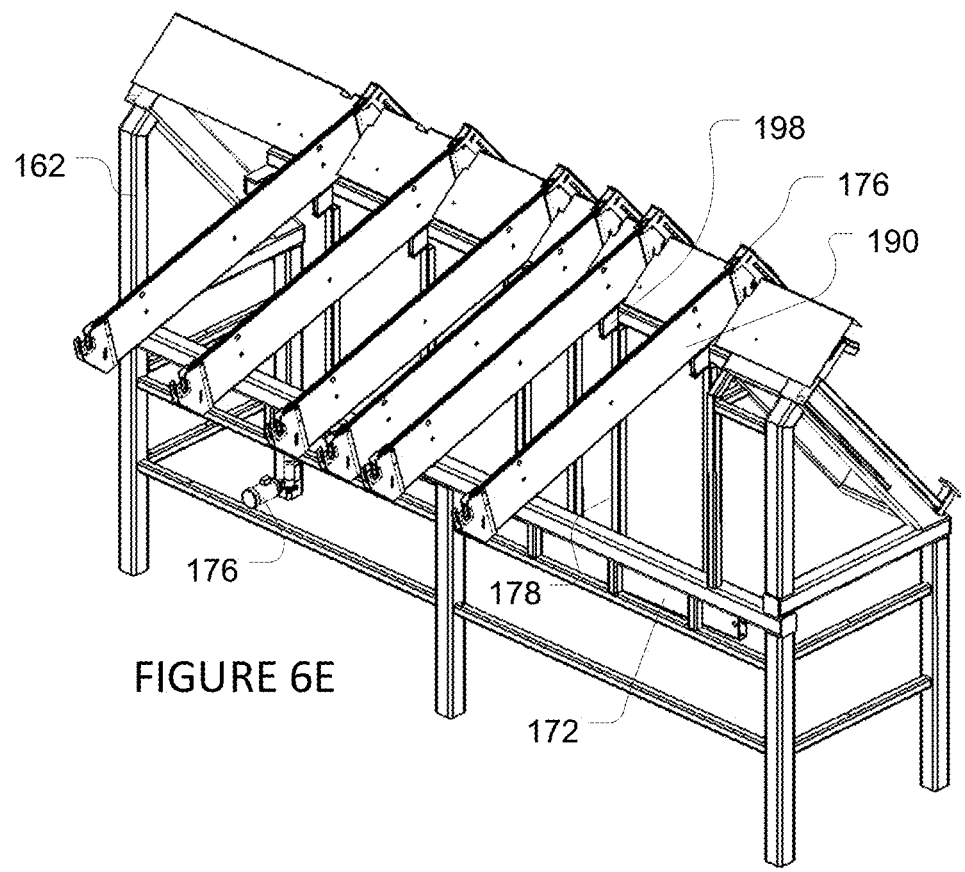
Figure 6F:
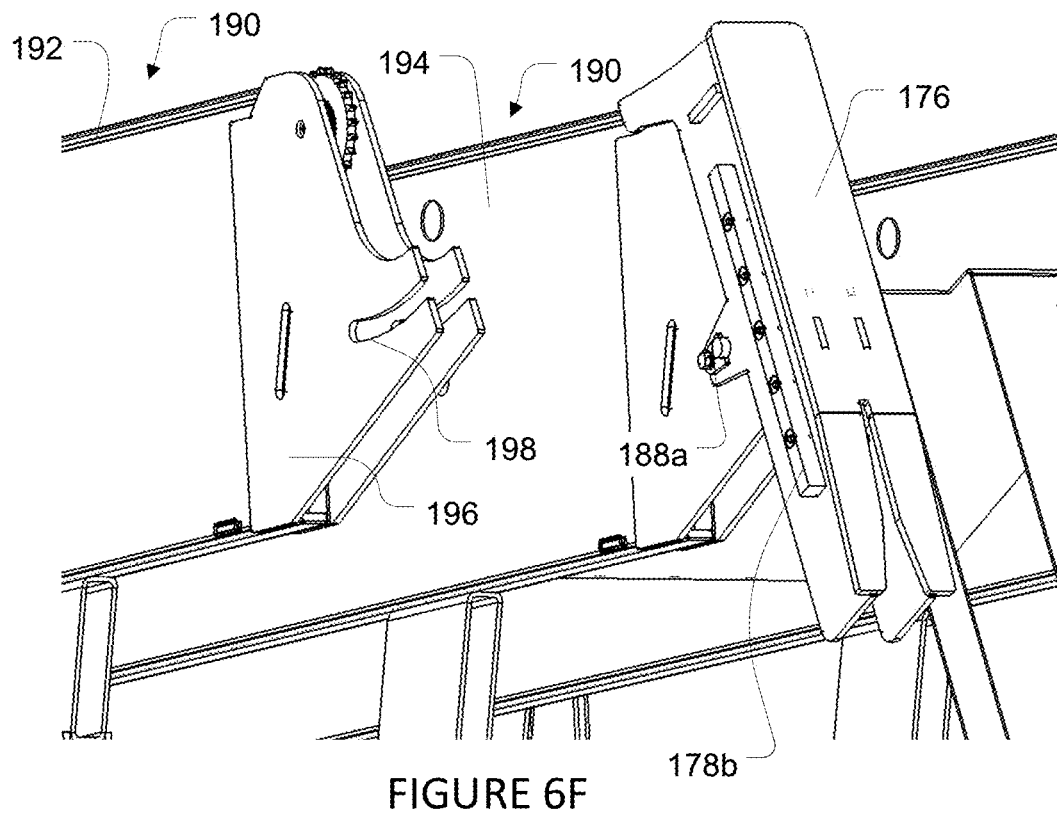

Spill arms 176 may be movably coupled with the support frame 162 at or near an upper edge of the inclined receiving surface 164 and spaced apart at intervals across the flow direction. In some embodiments, spill arms 176 may be pivotably coupled to the upstream ends of respective conveyors 190. For example, as best shown in FIG. 6F, each of the conveyors 190 may have a chain 192 supported on a frame 194. An upstream end 196 of the frame 194 may have an arcuate groove 192 that extends through the upstream end 196. The respective spill arm 176 may be configured to fit over the upstream end 196 of the conveyor, and a fastener 188a (e.g., a pin, bolt, or other such item) may be inserted through holes in the opposite sides of the spill arm and the groove 192. The arcuate shape of groove 192 may allow the upstream end of the conveyor to pivot about the fastener 188a relative to the spill arm, or vice versa.

Figure 6G:
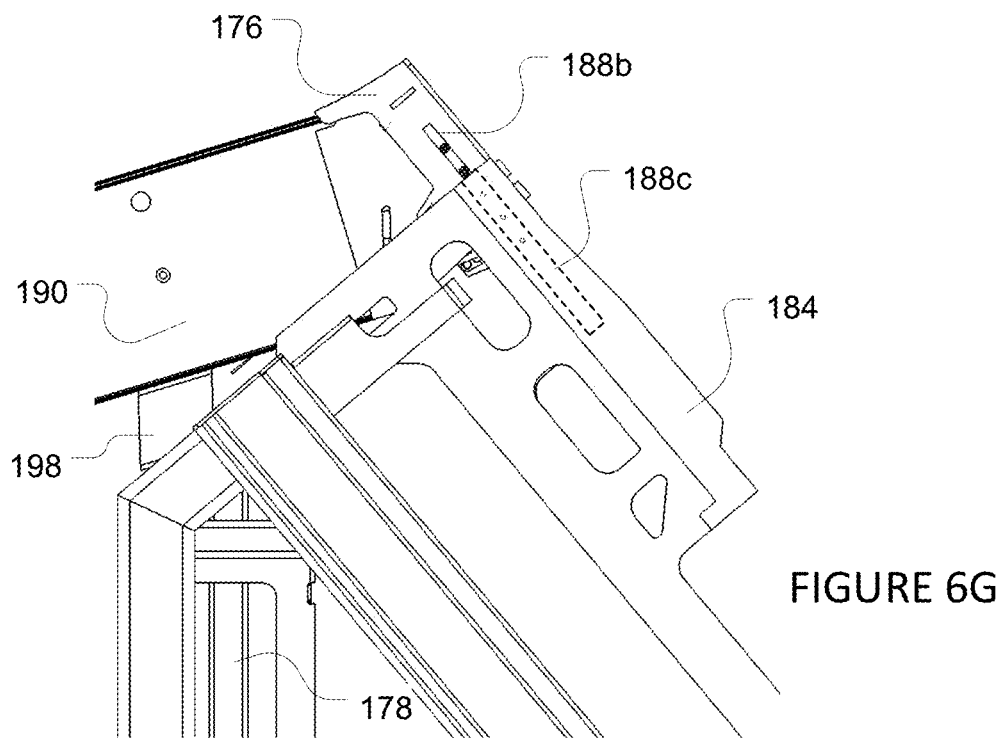

In some embodiments, one or more (or all) of the spill arms 176 may also include one or more fasteners 188b configured to be coupled with a corresponding portion of the support frame 162. Optionally, the fastener 188b may be configured to permit some movement of the spill arm relative to the support frame. For example, in some embodiments the fastener 188b may be a slide member (e.g., a block of material) configured to slide along a corresponding surface 188c (e.g., a rail, a channel, etc.) on the surface of an adjacent beam or plate of the support frame 162 (FIG. 6G).

In various embodiments, conveyors 190 and/or spill arms 176 may be mounted, directly or indirectly, to alignment beam 172. For example, as best shown in FIGS. 6D and 6E, in some embodiments tier alignment system 170 may include a plurality of upright supports 178. Each of the conveyors 190 may be positioned above, and/or supported on, the upper end of a respective upright support 178. The lower ends of upright supports 178 may be supported by the alignment beam 172. In other embodiments, spill arms 176 or conveyors 190 may be mounted directly to alignment beam 172. For example, the frame 194 of each conveyor 190 may be coupled to an underlying support arm 198 (FIGS. 6E, 6F) near the upstream end 196 of the conveyor. Support arm 196 may in turn be supported on a respective one of the upright supports 178 (FIGS. 6D-6F). Optionally, upright supports 178 may have rollers or other such features at one or both opposite ends to facilitate smooth lifting and lowering of the conveyors 190. Alternatively, in other embodiments upright supports 178 may be omitted, and support arms 198 or some other portion of the conveyors may be pivotably coupled to an upper surface of alignment beam 172 (see e.g., FIG. 7E).

In operation, actuator 174 may be operated to raise and lower the respect end 172b of the alignment beam 172 to thereby raise and lower the respective conveyors 190 and the upper ends of the respective spill arms 176 (see e.g., FIGS. 6B and 6D, showing alignment beam 172 lowered at end 172b relative to end 172a). The alignment beam 172 may be adjusted in this manner as each tier approaches the spill edge, to accommodate tiers that are not aligned with the spill edge—for example, where doubled sticks underlying one side of the tier cause that side of the tier to be elevated relative to the opposite side of the tier. While prior hoist systems include mechanisms for aligning the tier with the spill edge (e.g., by adjusting the hoist knees under the package), tier alignment systems in accordance with embodiments of the present disclosure enable the adjustment of the spill edge and/or the outfeed conveyors to thereby align the spill edge with the tier.

Figure 6H:
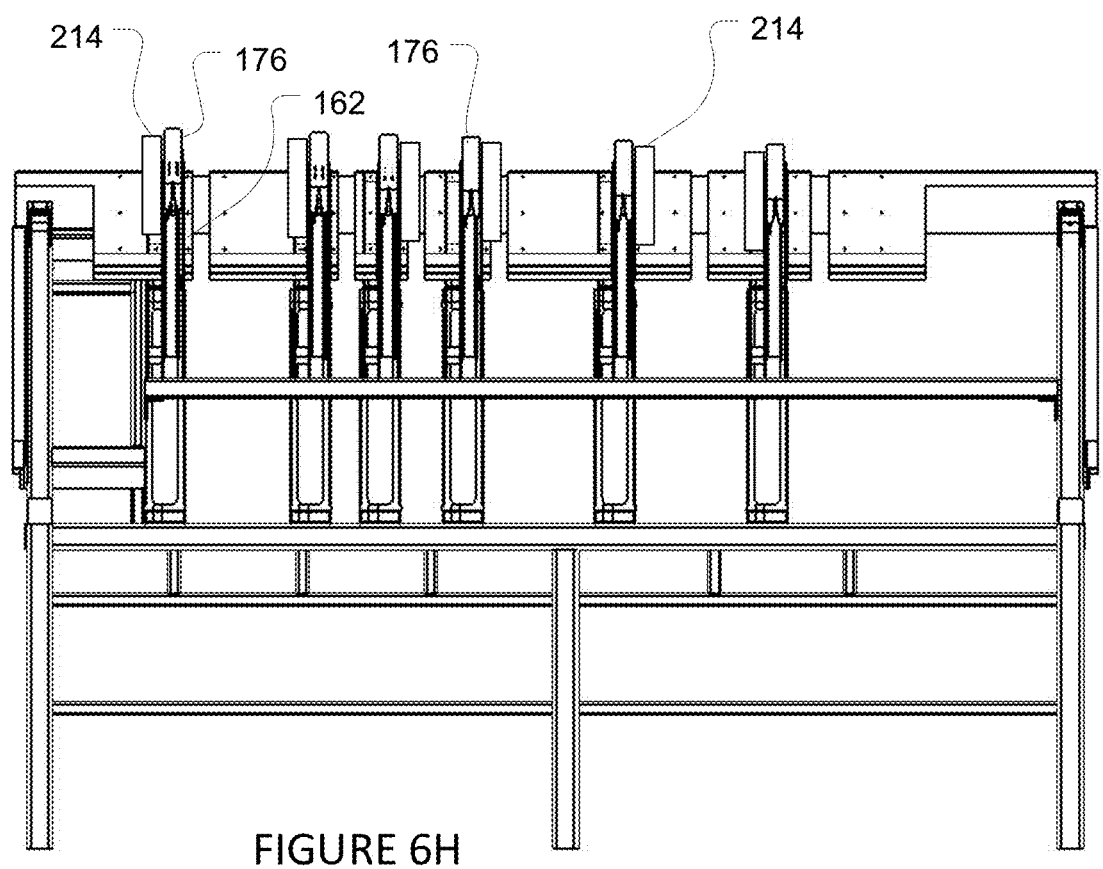

Alternatively, the tier alignment system may lack alignment beam 172 and actuator 174 in some embodiments. For example, the spill arms 176 may be movably or slideably coupled to the primary frame in the manner described above, or in any other suitable manner, and the tier alignment system may include a plurality of actuators 214. Each of the actuators 214 may be coupled to a respective one of the spill arms 176 and to the primary frame (see e.g., FIGS. 6G and 6H). Actuators 214 may be electric cylinders, other linear actuators, or any other type of actuator suitable for use to move the spill arms 176 relative to the frame in the desired manner. This configuration allows the spill arms to be repositioned independently of one another and does not require alignment beam 172 or actuator 174. The actuators 214 may be controlled individually to adjust the lateral slope of the spill edge. For example, the actuators 214 may be controlled automatically by a control system generally as described further below, except that the control system/computer system may send separate instructions to each actuator 214 (instead of sending instructions to actuator 174) to thereby adjust the lateral slope of the spill edge. Alternatively, the actuators 214 could be controlled manually by a human operator.

Figure 7A:
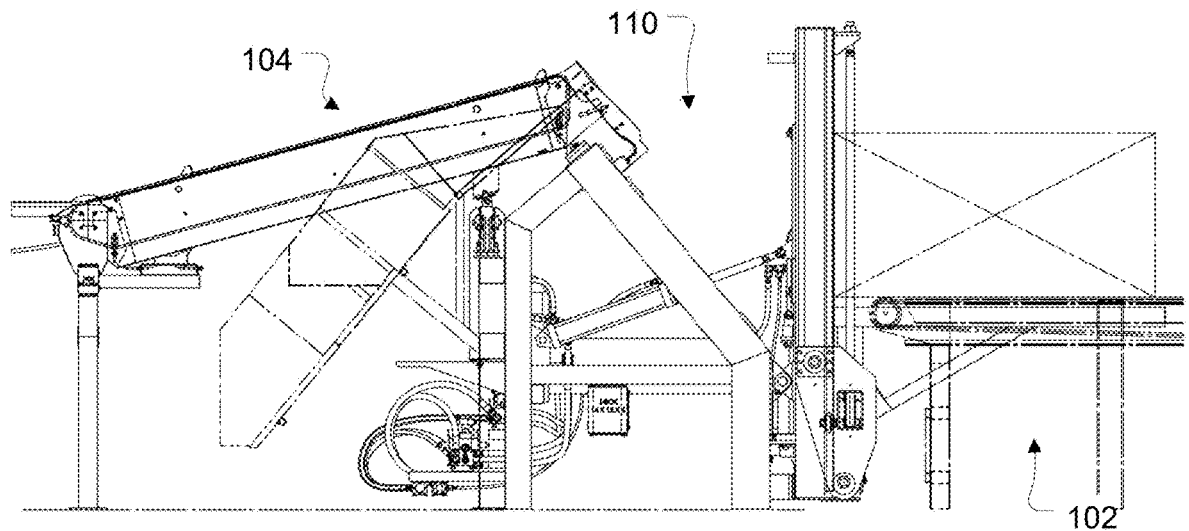
FIGS. 7A-7E illustrate another embodiment of a tilt hoist with a tier alignment system.
Figure 7B:
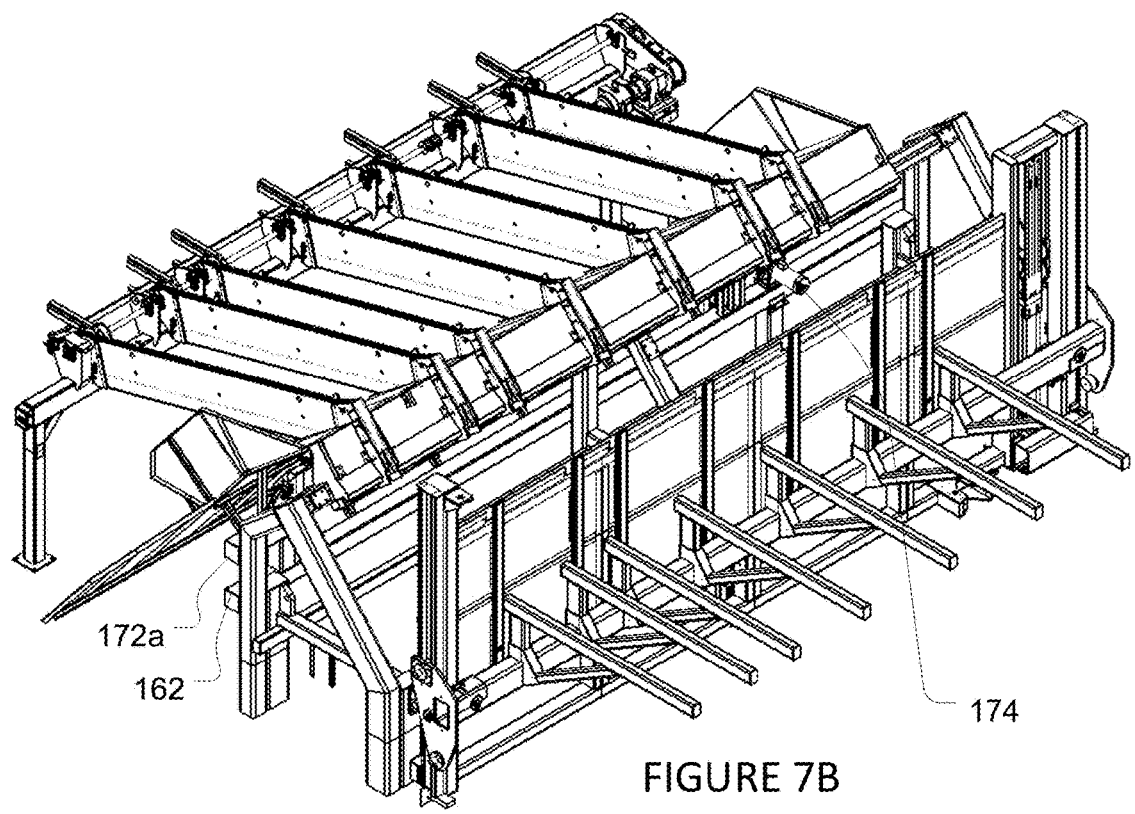

Other embodiments of lumber unstacking system 100 and tier alignment system 170 may have different configurations. For example, FIGS. 7A and 7B illustrate side elevational and partial perspective views, respectively, of an alternative embodiment of lumber unstacking system 100. In this embodiment, the tilt hoist 110 includes a conventional tilting mechanism (e.g., a hydraulic cylinder pivotably connected at opposite ends to the platform 142 and to the support frame of the frame assembly 160) instead of tilt assembly 112. This embodiment of tilt hoist 110 lacks a secondary hoist assembly and includes a tier alignment system as shown in FIG. 7C.

Figure 7C:
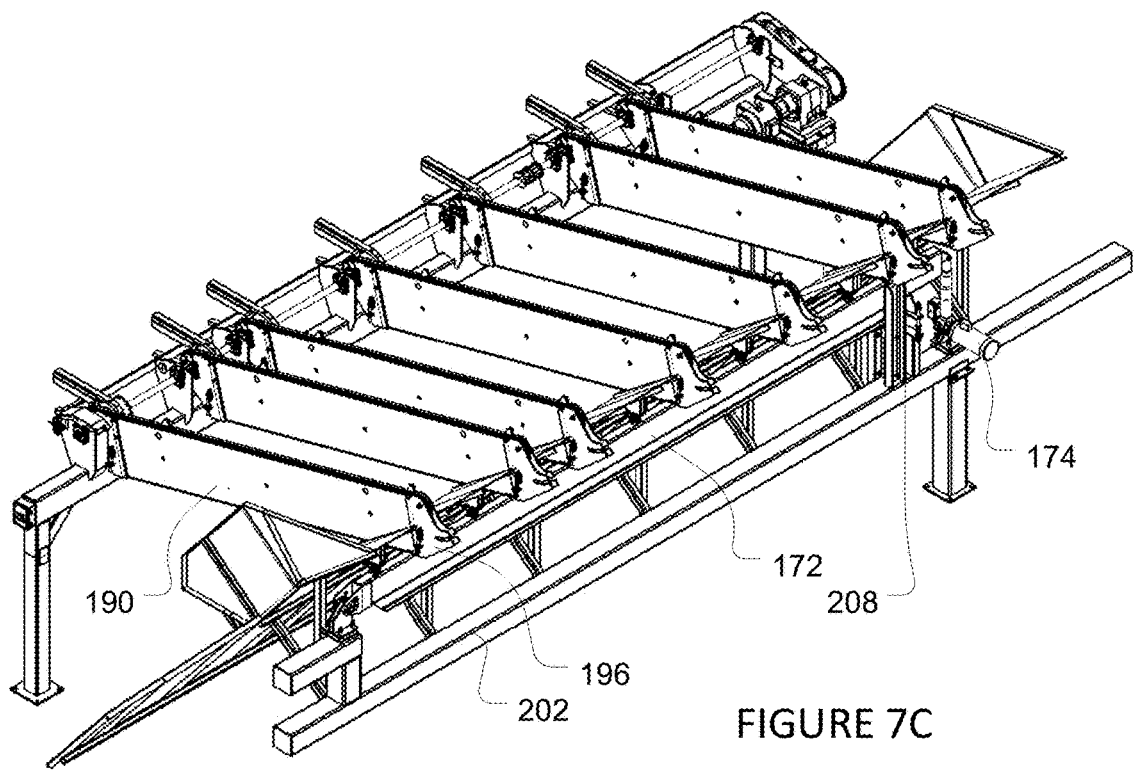
Figure 7D:
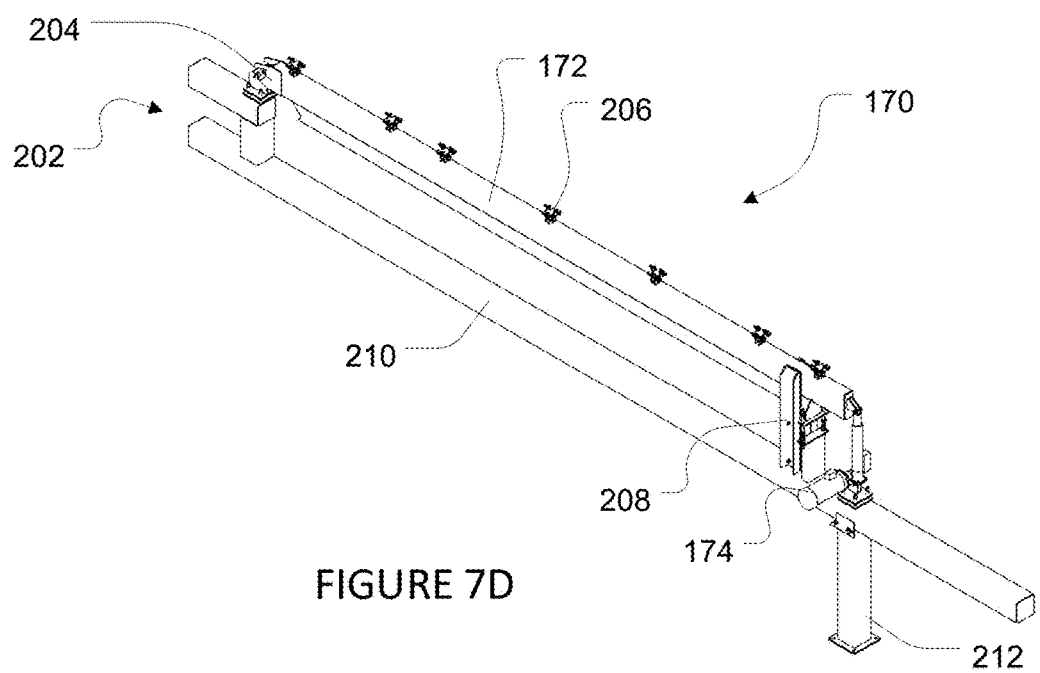

Referring now to FIGS. 7C and 7D, in addition to an alignment beam 172 and an actuator 174 as described above, some embodiments of tier alignment system 170 may optionally include a tier alignment frame 202. A first end of the alignment beam 172 may be pivotably coupled to a corresponding first end of the tier alignment frame 202 by a pivot member (e.g., by a hinge, pivot pin, or other suitable means), such that the end of the alignment beam is pivotable relative to tier alignment frame within a generally vertical plane. The actuator 274 may be pivotably coupled to the opposite second end of alignment beam 172 and to the corresponding second end of tier alignment frame 202. The tier alignment frame 202 may be coupled to the support frame of the frame assembly 160. For example, the tier alignment frame may be supported on a generally horizontal beam of the frame assembly along or near the downstream side of the assembly. Alternatively, tier alignment frame 202 may be attached to another portion of the frame assembly and/or may be supported on an underlying support surface, such as a floor.

In one embodiment, shown in FIG. 7D, tier alignment frame 202 may include a lateral support beam 210. Optionally, lateral support beam 210 may be supported on one or more legs 212. If present, the leg(s) may be beams or other structural members that are configured to be anchored to an underlying support surface (e.g., a floor or an underlying base frame). For example, a substantially vertical leg 212 may be provided under lateral support beam below the actuator 174.

A first end of alignment beam 172 may be coupled to a first end of the lateral support beam 210 by a pivot member 204, such as a hinge. Pivot member 204 may be coupled directly to the lateral support beam or coupled to another beam or other structure that is supported on the lateral support beam. Actuator 174 may be mounted to the opposite second end of lateral support beam 204 and to the second end of the alignment beam 172. Optionally, an alignment beam guide 208 may be provided along a portion of the tier alignment frame 202, proximal to actuator 174. Alignment beam guide 208 may be configured to limit side-to side motion and/or the tilting motion of the tier alignment beam. For example, alignment beam guide 208 may be shaped to extend upwardly on opposite sides of, and/or below, the tier alignment beam.

Figure 7E:
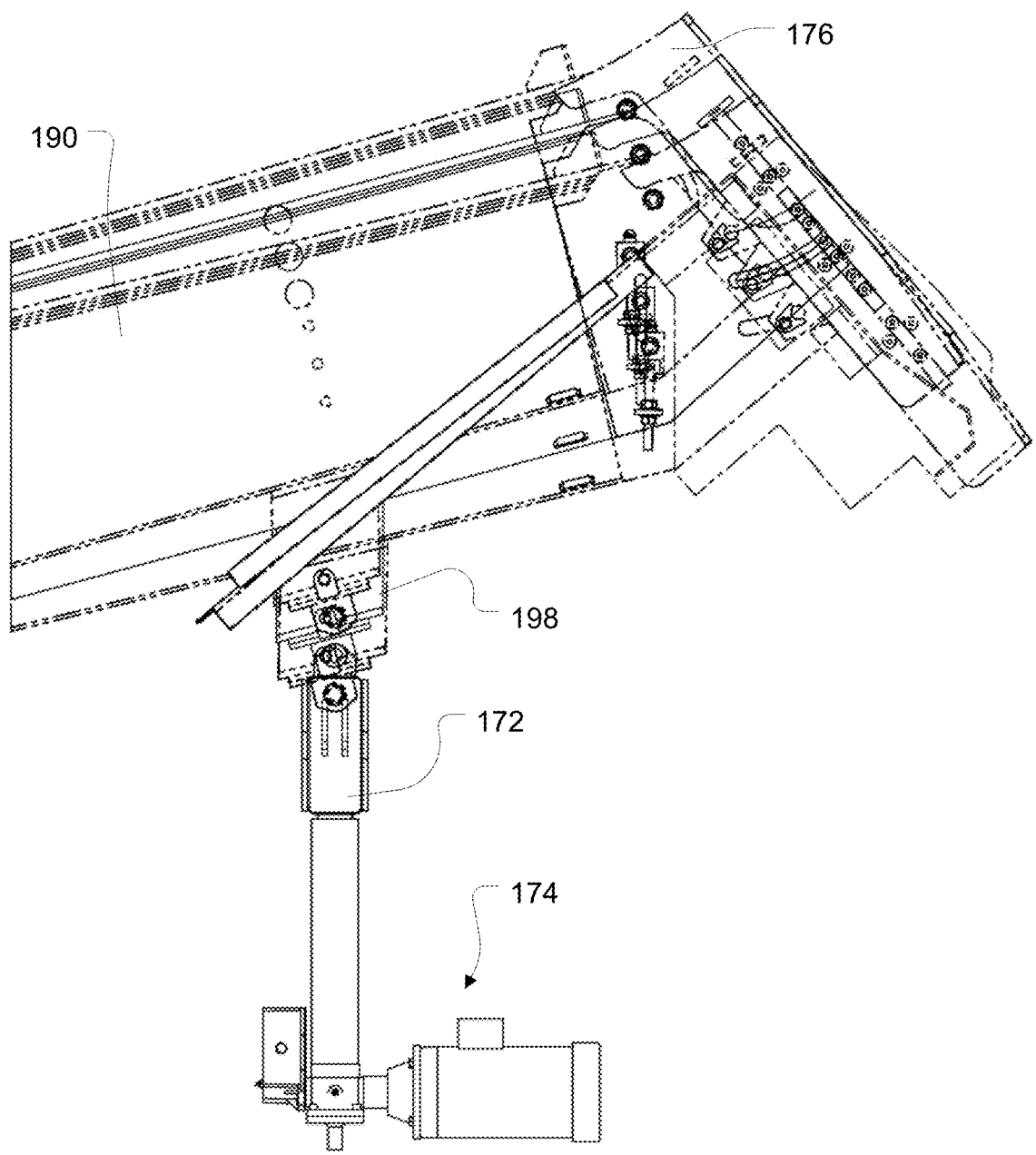

In some embodiments, as shown for example in FIG. 7C, an upstream portion of conveyors 190 may rest on the tier alignment beam 172 and the above-described upright supports 178 may be omitted. In that case, conveyor mounts 206 may be provided along an upper side of tier alignment beam 172. Conveyor mounts 206 may be configured to connect tier alignment beam 172 to a corresponding portion of the conveyors 190 (e.g., frames 192 or conveyor arms 198). Regardless, the actuator 174 may be selectively operable to raise and lower one end of alignment beam 172, thereby raising and lowering the respective conveyors 190 and spill arms 176 over one end of the alignment beam relative to the other end and/or tilting the spill edge relative to horizontal. FIG. 7E illustrates a conveyor 190 and corresponding spill arm 176 in a neutral position (solid lines) and in a raised and a lowered position (broken lines).

While the above discussion refers to the 'ends' of the beams 172 and 210, this term merely refers to portions of the beams that are on opposite sides of a centerline, as opposed to the terminal end surfaces of the beams. Thus, actuator 174 and/or pivot member 204 may be positioned at any suitable location along the beams. For example, in one alternative configuration the pivot member may be, or may function as, a fulcrum. In that case, the pivot member may be located along the centerline, between the alignment beam and the lateral support beam or some portion of the primary support frame, such that the actuator lowers one end of the alignment beam while raising the other end of the alignment beam.

Figure 8:
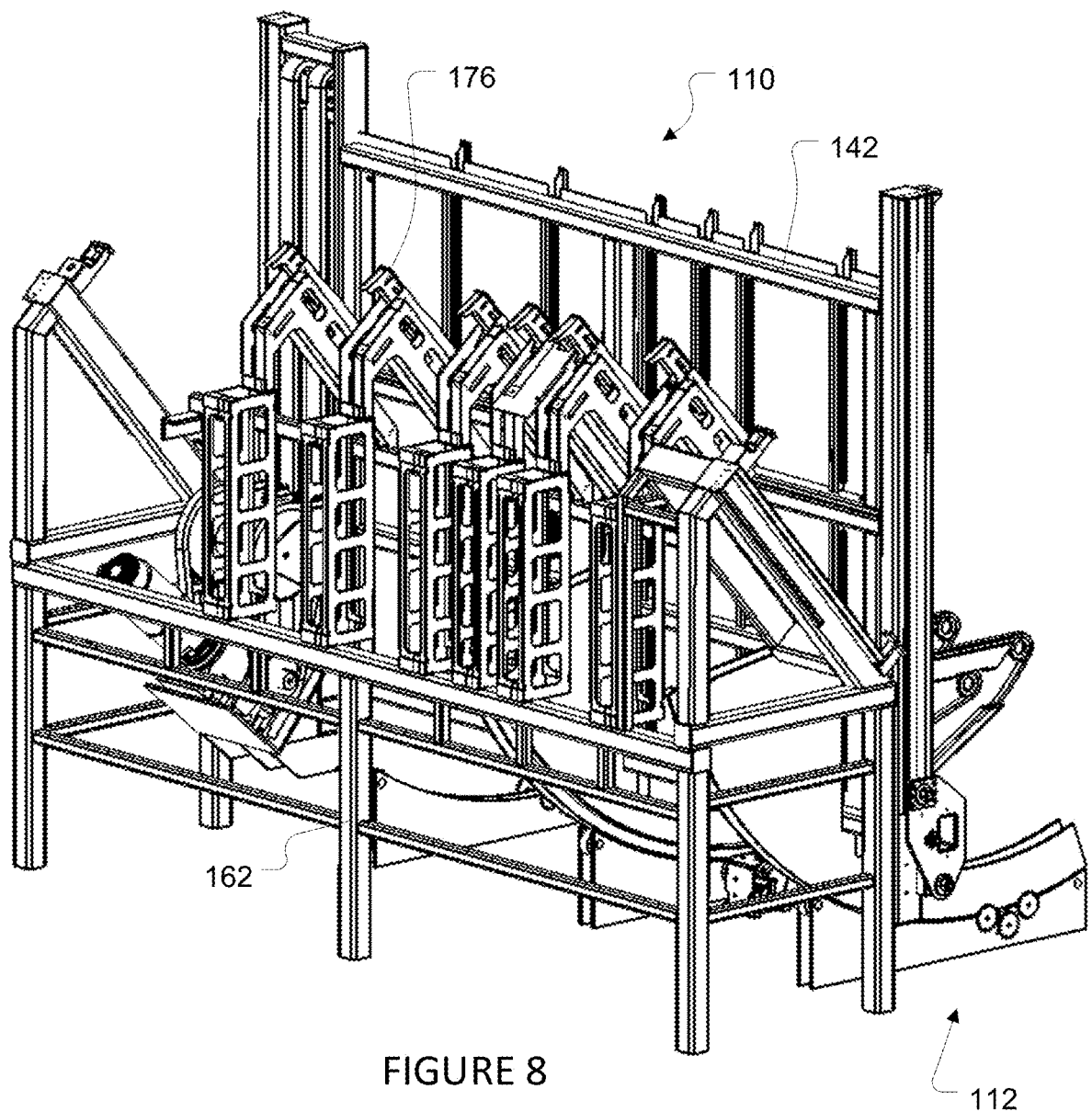
FIG. 8 illustrates another embodiment of a tilt hoist with a tilt assembly.

Some embodiments of tilt hoist 110 include both tilt assembly 112 and tier alignment system 170 (see e.g., FIG. 3). Other embodiments include tier alignment system 170 without tilt assembly 112 (see e.g., FIG. 7B). For example, tier alignment system 170 may be incorporated into an otherwise conventional tilt hoist, either during construction of the tilt hoist or as a retrofit/upgrade. Still other embodiments of tilt hoist 110 include tilt assembly 112 without tier alignment system 170. FIG. 8 illustrates one such an embodiment by way of example. Instead of tier alignment system 170, this embodiment includes a conventional primary hoist knee bias/leveling mechanism. For example, in this embodiment the primary knees may be mounted on a beam and the lateral slope of the beam may be adjusted by way of a chain that extends through the beam and is anchored at its opposite ends to the opposite sides of the knee frame, as described in the Background section above. As such mechanisms are well known in the art, they are not described further herein.

Figure 9A:
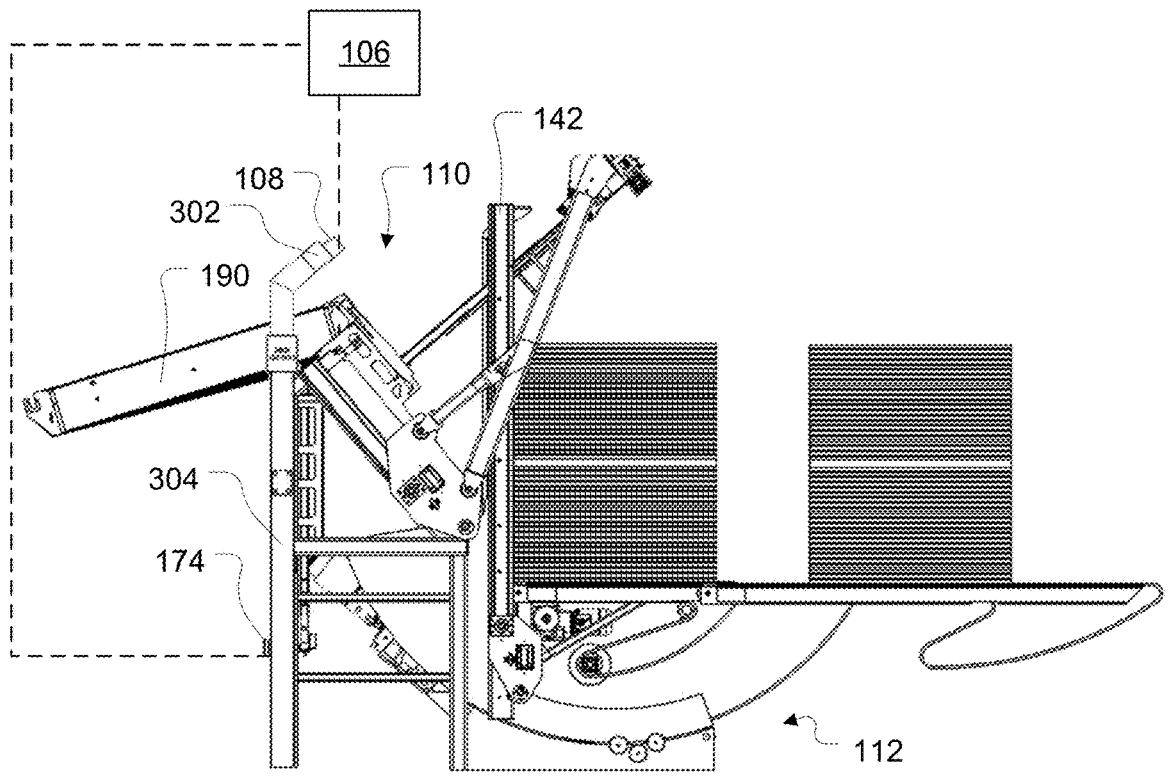
FIGS. 9A-9B illustrate a lumber unstacking system and a tilt hoist with control systems, all in accordance with various embodiments.

In various embodiments, a lumber unstacking system and/or tilt hoist may include a tier alignment system and a control system configured to automatically control the tier alignment system. Referring again to FIG. 1B, in some embodiments the control system may include computer system 106 and one or more sensors 108. An embodiment of lumber unstacking system 100 with a tier alignment system and a control system is shown by way of example in FIGS. 9A and 9B.

Figure 9B:
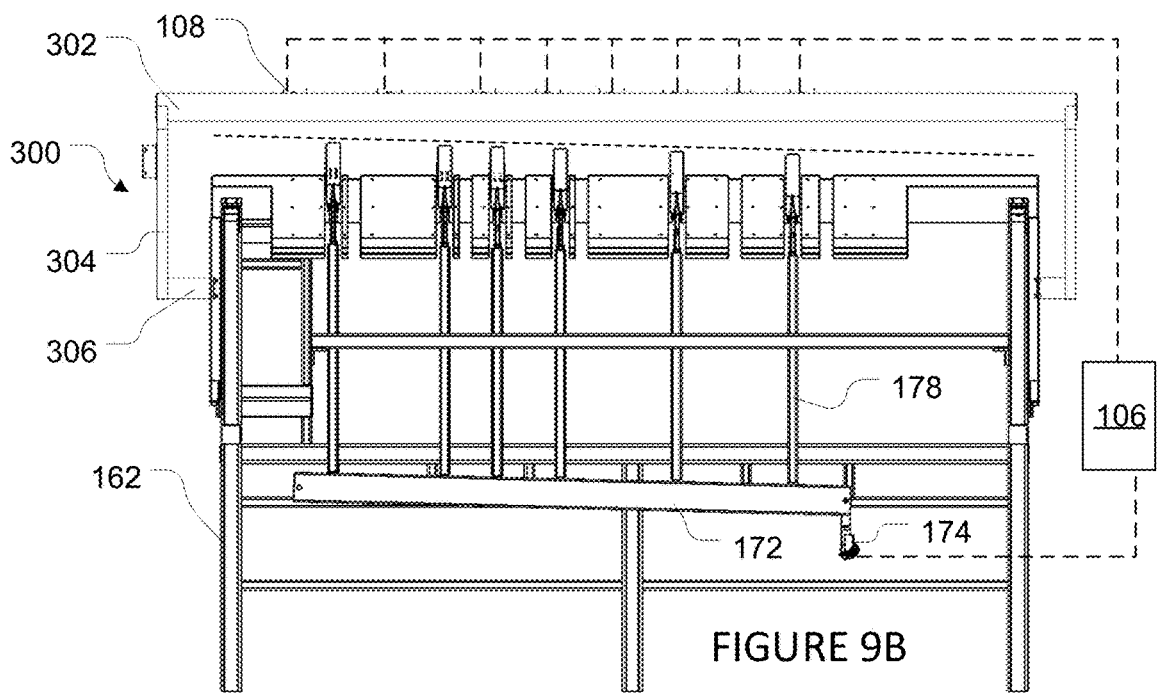

Optionally, the control system may further include a sensor support frame 300. For example, sensor support frame 300 may include a transverse support 302 supported at or near its opposite ends by a pair of support arms 304. In some embodiments support arms 304 may be fastened to an underlying support surface, such as a floor (see e.g., FIG. 9A). Alternatively, support arms 304 may be fastened to another component of the lumber unstacking system, such as main support frame 162. For example, as shown in FIG. 9B, support arms 304 may be connected to main support frame 162 by connecting beams 306. Regardless, sensor support frame 300 may be configured to retain the sensors 108 in respective positions above the tilt hoist and/or letdown conveyor, and spaced apart across the direction of flow, such that the sensors 108 are positioned to detect an upper-most tier of boards as it approaches the spill edge.

A plurality of sensors 108 may be arranged along transverse support 302. Sensors 108 may be distance sensors configured to determine a distance between the sensor and another object. Sensors 108 may be positioned above the spill edge of the tilt hoist. Optionally, the fields of view of the sensors may be substantially normal to the faces of the pieces of lumber.

The computer system 106 may be programmed to determine the lateral slope of the tier based on distance measurements received from sensors 108 for that tier, and to determine whether the lateral slope of the tier matches the lateral slope of the spill edge (see FIG. 9B, broken line along upper ends of spill arms 176 indicates lateral slope of spill edge). In response to identifying a mismatch between the lateral slope of the tier and the lateral slope of the spill edge, the computer system may generate and send instructions to another device to perform a corrective action, such as leveling the tier (e.g., by raising one or more knees relative to the others) or stopping the tilt hoist. For example, in embodiments that include tier alignment system 170, the computer system may determine the difference between the lateral slope of the tier and the lateral slope of the spill edge and send instructions to actuator 174 to adjust the lateral slope of the spill edge to reduce or eliminate the determined difference. Optionally, the computer system may send instructions to another mechanism to adjust the lateral slope of the package instead of, or in addition to, sending instructions to actuator 174. For example, the computer system may be programmed to generate and send commands to a programmable logic controller (PLC) to actuate a leveling mechanism that adjusts the lateral slope of the beam on which the hoist knees are mounted. Alternatively, the computer system may generate and send an alert to a human operator in response to identifying the mismatch.

In some embodiments, the computer system may be programmed to identify a distance measurement that represents a stick or dunnage, as opposed to the upper surface of the tier, and to determine the lateral slope of the tier without using the identified measurements. For example, the computer system may be programmed to identify a false measurement based on measurements received for that tier from the nearest adjacent distance sensor(s), a significant deviation from the measurements received for that tier from most or all of the other distance sensors, and/or image data from an optical sensor positioned to detect laser spots projected onto the tier by the distance sensors.

Optionally, the computer system may be programmed to control one or more of the other actuators included in the lumber unstacking system. For example, computer system 106 may be configured to control any one or more of drives 132, 148, 158, and/or 186.

Embodiments of a tilt hoist as described herein may include a rotation table (e.g., tilt assembly 112) and/or a tier alignment system (e.g., tier alignment system 170). Optionally, such embodiments may further include one or more other features described herein, such as a control system, a measurement system, a secondary hoist assembly, and/or an outfeed, alone or in any combination. In a particular embodiment, a tilt hoist includes a rotation table, a tier alignment system, and a secondary hoist assembly, all with respective electric drives (e.g., electric motors).

In various embodiments, a method of upgrading an existing tilt hoist may include providing the existing tilt hoist with a rotation table (e.g., tilt assembly 112) and/or a tier alignment system (e.g., tier alignment system 170). In some embodiments, the method may further include providing the existing tilt hoist with one or more other features described herein, such as a control system, a measurement system, a secondary hoist assembly, and/or an outfeed, alone or in any combination. Optionally, the method may include replacing a hydraulic drive of the existing tilt hoist with one or more electric drives.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A tilt hoist comprising:
    a rotation table, wherein the rotation table includes
        a tilt frame with an arcuate lower surface; and
        a support base with a frame and a plurality of contact members coupled to the frame, wherein the support base is configured to support the tilt frame on the contact members, and the contact members are configured to moveably engage the arcuate lower surface of the tilt frame, such that the tilt frame is movable in opposite rotary directions relative to the support base, along an arcuate path, to thereby rotate about an axis of rotation; and
    a platform assembly coupled with the tilt frame and having a first support surface and a second support surface that is transverse to the first support surface,
    wherein the tilt frame is movable along the arcuate path to rotate about the axis of rotation between an upright position, in which the first support surface is generally vertical, and a tilted position in which the first support surface is inclined,
    wherein the platform assembly is operable to support a stack of lumber on the second support surface while the tilt frame is in the upright position and to move the stack of lumber along the first support surface while the tilt frame is in the tilted position, and
    wherein the axis of rotation is above the arcuate lower surface in the upright position and in the tilted position.

2. The tilt hoist of claim 1, wherein the support base includes a plurality of plates arranged generally in parallel across a flow direction, and the plurality of contact members includes a plurality of rollers rotatably coupled to the plates, and wherein the tilt frame is supported on the rollers.

3. The tilt hoist of claim 1, wherein the tilt frame has a plurality of generally parallel plate members with respective arcuate surfaces that collectively form the arcuate lower surface of the tilt frame, and wherein the contact members are arranged in pairs to contact the respective arcuate surfaces.

4. The tilt hoist of claim 1, wherein the platform assembly includes a platform fixedly mounted to the tilt frame and a primary knee assembly movably coupled to the platform assembly, the platform includes a plurality of support members arranged to form the first support surface, and the primary knee assembly includes a plurality of primary knees that collectively define the second support surface and are collectively configured to support the stack of lumber on the second support surface, wherein the platform is substantially vertical when the tilt frame is in the upright position and the platform is inclined when the tilt frame is in the tilted position, and wherein the primary knees are selectively movable, relative to the platform, from a lowered position to a raised position while the tilt frame is in the tilted position to thereby move the stack of lumber along the first support surface toward an upper edge of the platform.

5. The tilt hoist of claim 1, further including a drive system selectively operable to move the tilt frame between the upright position and the tilted position.

6. The tilt hoist of claim 5, wherein the drive system includes a chain connected to opposite ends of the arcuate lower surface of the tilt frame and a motor operatively coupled with the chain.

7. The tilt hoist of claim 6, wherein the drive system further includes a shaft coupled with the support base and a sprocket disposed along the shaft, the motor is connected to the shaft, and the chain is engaged by the sprocket, such that rotation of the shaft and the sprocket by the motor drives the chain to thereby move the tilt frame between the upright position and the tilted position.

8. The tilt hoist of claim 6, wherein the motor is an electric motor.

9. The tilt hoist of claim 4, wherein the primary knee assembly includes a first beam with opposite first and second ends that are slideably mounted to first and second lateral ends, respectively, of the platform such that the first beam extends across the first support surface, and wherein the primary knees are mounted to the first beam.

10. The tilt hoist of claim 9, wherein the primary knee assembly includes a leveling chain disposed through the first beam and fastened to the lateral ends of the platform, wherein the leveling chain is adjustable to thereby raise or lower one of the ends of the first beam relative to the other one of the ends of the first beam.

11. The tilt hoist of claim 9, wherein the primary knee assembly further includes
    a first hoist chain mounted to the platform and oriented generally perpendicular to the first beam, and
    a hoist chain drive mounted to the platform and operatively coupled with the first hoist chain,
    wherein the first beam is attached to the first hoist chain, and the hoist chain drive is selectively operable to drive the first hoist chain in opposite directions relative to the platform to thereby move the first beam along the platform.

12. The tilt hoist of claim 11, wherein the hoist chain drive includes an electric motor.

13. The tilt hoist of claim 12, wherein the first hoist chain includes one or more endless chains or belts positioned along the second lateral end of the platform, the electric motor is mounted to the second lateral end of the platform, and the first beam and the electric motor are disposed on opposite sides of the platform.

14. The tilt hoist of claim 4, wherein the primary knee assembly includes a plurality of conveyor chains or belts coupled with respective ones of the primary knees and a conveyor drive that is selectively operable to drive the conveyor chains or belts to thereby move the stack of lumber along the primary knees toward the platform while the tilt frame is in the upright position.

15. A lumber unstacking system comprising:
a tilt hoist as recited in claim 1;
a support frame; and
a tier alignment system, wherein the tier alignment system includes
one or more spill arms movably coupled with the support frame and spaced apart across a direction of flow, wherein the spill arms collectively define a spill edge; and
one or more actuators coupled to the support frame and the spill arms, wherein the one or more actuators is selectively operable to raise and lower the spill arms relative to the support frame to thereby adjust a lateral slope of the spill edge.

16. The lumber unstacking system of claim 15, wherein the one or more actuators includes a first actuator, the tier alignment system further includes an alignment beam pivotably coupled to the support frame and coupled to the first actuator, and the first actuator is selectively actuable to raise and lower a first end of the alignment beam relative to a generally opposite second end of the alignment beam to thereby adjust the lateral slope of the spill edge.

17. The tilt hoist of claim 15, wherein the one or more actuators includes a plurality of actuators, each of the actuators is coupled to a respective one of the spill arms and to the support frame, and the actuators are independently actuable to thereby raise and lower the respective spill arms.

18. The tilt hoist of claim 15, further including an outfeed with a plurality of conveyors, wherein upstream ends of the conveyors are pivotably coupled with respective ones of the spill arms, such that the upstream ends of the conveyors are vertically adjustable in concert with the respective spill arms.

19. The tilt hoist of claim 15, further including a control system operatively coupled with the tilt hoist, wherein the control system includes a plurality of distance sensors positioned to detect a tier of lumber proximal to the spill edge of the tilt hoist and a computer system configured to determine a lateral slope of the tier of lumber based at least on data from the sensors.

20. The tilt hoist of claim 19, wherein the computer system is operatively coupled with the one or more actuators and configured to control the one or more actuators based at least on the determined lateral slope of the tier of lumber.

* * * * *